(12) United States Patent
Matsugashita

(10) Patent No.: US 8,625,131 B2
(45) Date of Patent: Jan. 7, 2014

(54) COMMUNICATION BETWEEN SERVER AND IMAGE FORMING APPARATUS

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 707 days.

(21) Appl. No.: 12/621,893

(22) Filed: Nov. 19, 2009

(65) Prior Publication Data

US 2010/0128298 A1    May 27, 2010

(30) Foreign Application Priority Data

Nov. 27, 2008    (JP) .................................. 2008-302846

(51) Int. Cl.
*G06F 3/12*        (2006.01)
*G06F 15/00*     (2006.01)
*G06K 1/00*      (2006.01)

(52) U.S. Cl.
USPC ........................... 358/1.15; 358/1.9; 358/1.13

(58) Field of Classification Search
None
See application file for complete search history.

(56) References Cited

U.S. PATENT DOCUMENTS

| | | | |
|---|---|---|---|
| 6,278,532 B1* | 8/2001 | Heimendinger et al. ..... | 358/442 |
| 2002/0085705 A1* | 7/2002 | Shires ...................... | 379/265.04 |
| 2003/0033543 A1* | 2/2003 | Hubbard et al. .............. | 713/201 |
| 2004/0085366 A1* | 5/2004 | Foster et al. ................. | 345/854 |
| 2004/0148327 A1 | 7/2004 | Satomi et al. | |
| 2004/0148389 A1 | 7/2004 | Satomi et al. | |
| 2004/0187036 A1* | 9/2004 | Nakamura .................... | 713/202 |
| 2005/0015601 A1* | 1/2005 | Tabi ............................. | 713/182 |
| 2005/0188226 A1* | 8/2005 | Kasatani ....................... | 713/201 |
| 2006/0114501 A1* | 6/2006 | Nakamura ................... | 358/1.15 |
| 2006/0193001 A1* | 8/2006 | Ii .................................. | 358/1.15 |
| 2007/0011303 A1 | 1/2007 | Hatakeyama et al. | |
| 2007/0121151 A1* | 5/2007 | Uchida ......................... | 358/1.15 |
| 2007/0226776 A1* | 9/2007 | Tsugawa .......................... | 726/1 |
| 2008/0034403 A1* | 2/2008 | Kakigi ............................. | 726/1 |
| 2008/0120340 A1 | 5/2008 | Hashimoto | |

FOREIGN PATENT DOCUMENTS

| | | |
|---|---|---|
| JP | 2003076662 A | 3/2003 |
| JP | 2004-227360 A | 8/2004 |
| JP | 2006-197230 A | 7/2006 |
| JP | 2007048266 A | 2/2007 |
| JP | 2008-40659 A | 2/2008 |
| JP | 2008-129955 A | 6/2008 |
| JP | 2008-219911 A | 9/2008 |

OTHER PUBLICATIONS

Japanese Office Action dated Jan. 29, 2013 in corresponding Japanese Application No. 2008-302846.

* cited by examiner

*Primary Examiner* — Ming Hon
(74) *Attorney, Agent, or Firm* — Fitzpatrick, Cella, Harper & Scinto

(57) ABSTRACT

A problem that it is difficult to associate a log of processing executed in a web browser of an image forming apparatus with a log of processing executed in a web application server, and thus it is difficult to track the logs as a series of processing logs. The image processing apparatus receives an execution request of a function of the image forming apparatus and obtains identification information for a log of processing executed in the server apparatus in response to the received execution request of the function. The image forming apparatus stores a log of processing in the image forming apparatus related to the processing in the server apparatus corresponding to the obtained identification information, in association with the obtained identification information.

2 Claims, 19 Drawing Sheets

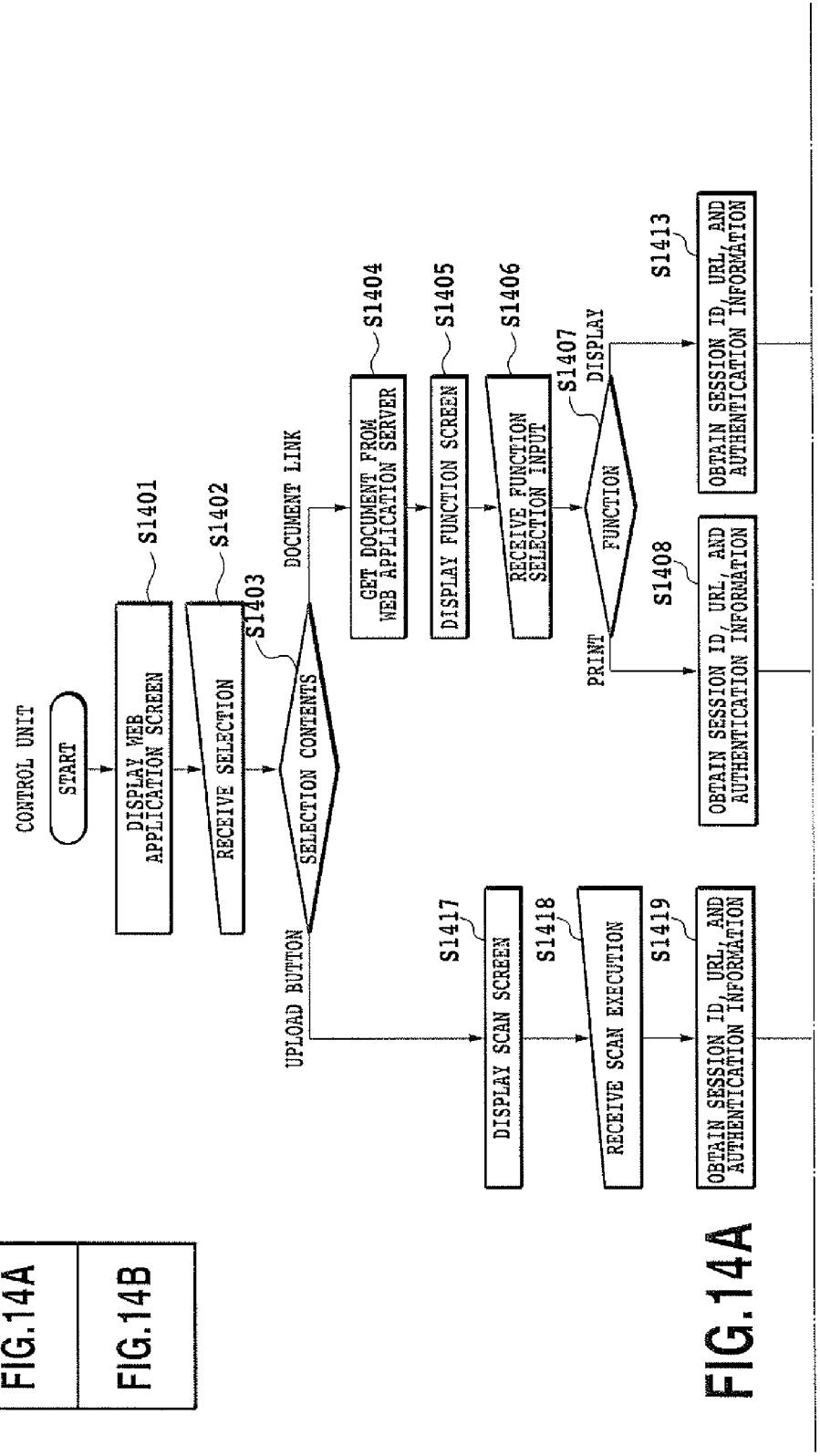

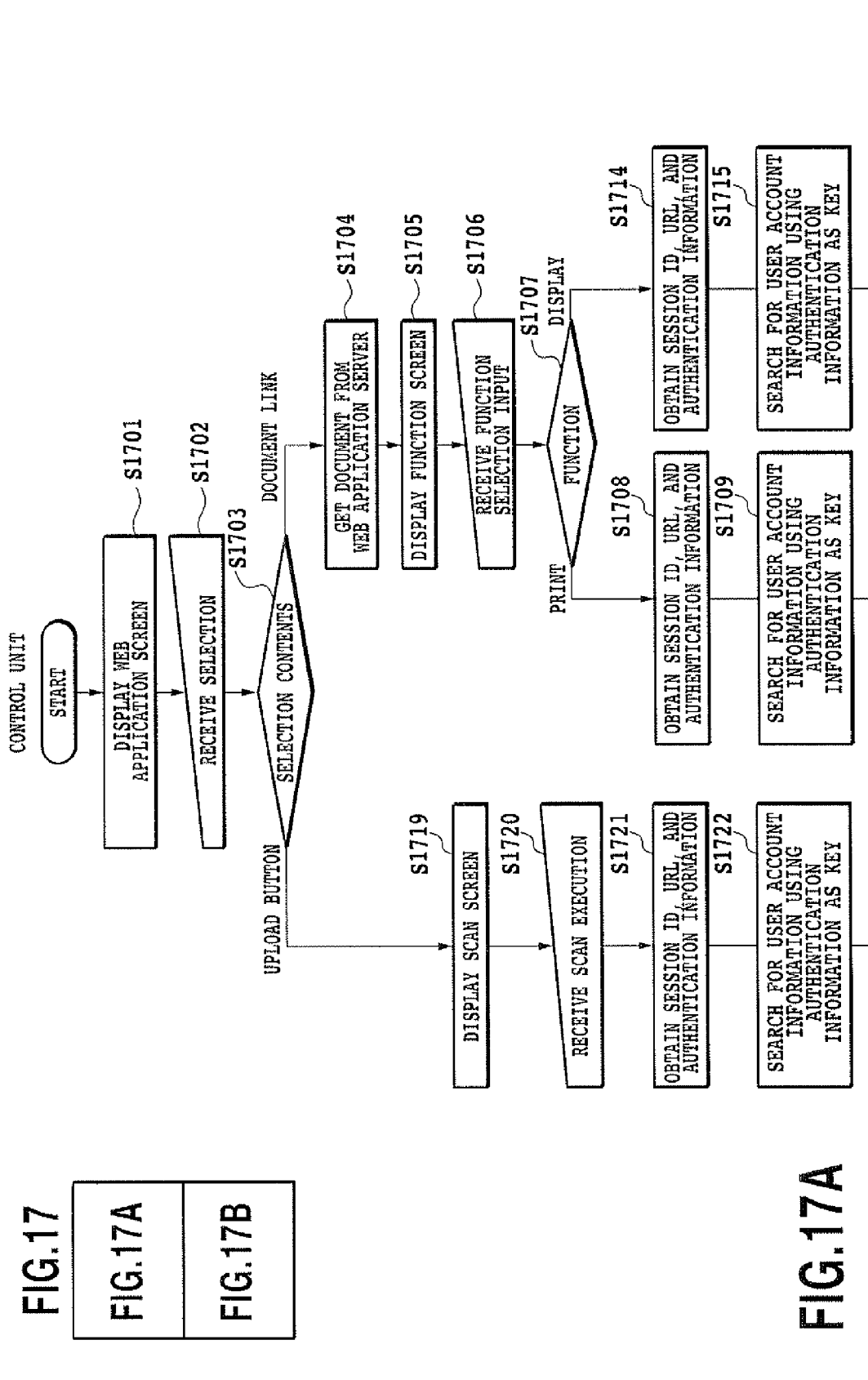

COMMUNICATION BETWEEN SERVER AND IMAGE FORMING APPARATUS

BACKGROUND OF THE INVENTION

1. Field of the Invention

The present invention relates to image forming apparatuses, log recording methods, and programs, and, in more detail, relates to an image forming apparatus, a log recording method, and a program for associating log information of the image forming apparatus with log information of a web server operating in conjunction with the image forming apparatus to provide a series of audit trails.

2. Description of the Related Art

An audit trail is a record preserved along a temporal sequence for a system auditor to track operation of an information system and contents and process during the operation. The audit trail is used for verifying that reliability, safety, efficiency, effectiveness, etc. are secured in the information system. Generally, a log recorded by the information system is an important audit trail. Japanese Patent Laid-Open No. 2003-076662 discloses a method tracking an information leaker by searching for a log as this audit trail.

However, when a user carries out an operation across a plurality of devices connected with each other via a network, the logs exist across the plurality of devices and it is difficult to associate the logs of the same user (or same access source and the like) with each other. For solving this problem, Japanese Patent Laid-Open No. 2007-048266 discloses a method identifying an access source according to recorded date and time and access person information (i.e., user account information) in the log output from each device and pursuing the operation by sequentially tracking the logs.

Meanwhile, there is known an image forming apparatus containing functions of respective devices such as a printer, a copier, a facsimile, and a scanner in one housing. Such a composite type image forming apparatus has applications corresponding to respective devices and operates as the printer, the copier, the scanner or the facsimile by switching the applications. When the various kinds of functions such as the printer, the copier, and the facsimile, are utilized, this image forming apparatus generates and executes a job corresponding to each of the functions. Then, after the job has been completed, the result is recorded as a job log. By analyzing this job log (i.e., audit trail), it is possible to track a use situation and a user of the image forming apparatus.

Further, there is known a technique causing the image forming apparatus to combine a web browser for a web client function, to obtain (download) various contents from a remote control web application server and browse them, and to improve the functions of the image forming apparatus. In such a configuration, the web browser of the image forming apparatus executes various functions such as the printer and the scanner provided to the image forming apparatus according to the information contents obtained from the web application server.

For associating the logs recorded across the plurality of devices with each other according to the method of above described Japanese Patent Laid-Open No. 2007-048266, the logs recorded in each of the devices need to have common information (same information). For example, the same date and time information, or the same user account information or user ID information needs to exist within the logs of the plurality of devices.

In an actual case, however, the same user sometimes log-ins to a certain device using a user account of A and log-ins to another device using a user account of B. Accordingly, there can be a case where common information does not exist in both devices. In such a case, there is a problem that the log information cannot be associated with one another among the plurality of devices. For this point, it facilitates understanding to consider a specific environment as follows, and thus a specific environment will be described. Note that this environment is only an example and the present invention is not limited to a usage in such an example of the environment.

First, a web browser of the image forming apparatus directly instructs an application of the image forming apparatus according to information obtained from a web application server, in a method as follows.

When the web browser of the image forming apparatus accesses the web application server, a log of the access and a log of a website operation are recorded in the web application server. Recording time and user information recorded in the logs of the web application server are information managed within the web application server.

On the other hand, when the web browser of the image forming apparatus directly instructs the application of the image forming apparatus and executes the function of the image forming apparatus, a job log of these operations is recorded in the image forming apparatus. Recording time and user information recorded in the job log are information managed in the image forming apparatus.

As a result, when the user information managed by the image forming apparatus and the user information managed by the web application server are different from each other, it is very difficult to associate the logs recorded in the respective apparatuses with each other.

Further, time is not always adjusted accurately between the image forming apparatus and the web application server (time itself is different particularly when recoding is done in a local time of a region), probably the logs cannot be associated with each other using the recording date and time.

Further, since web application of the image forming apparatus implemented in the web application server is operated by web browsers of a plurality of image forming apparatuses at the same time, one access source cannot be specified only by the log recording date and time.

SUMMARY OF THE INVENTION

An image forming apparatus according to the present invention is an image forming apparatus communicably connected to a server apparatus via a network, the image forming apparatus comprising: a unit receiving an execution request of a function included in the image forming apparatus; a unit obtaining log identification information of processing executed in the server apparatus in response to the received execution request of the function, from the server apparatus; and a unit storing a log of processing executed in the image forming apparatus in response to the received execution request of the function in association with the received identification information.

The present invention can provide an image forming apparatus, a log recording method, and a program for recording the audit trail which has information common to both of the web application server and the image forming apparatus.

Further features of the present invention will become apparent from the following description of exemplary embodiments (with reference to the attached drawings).

BRIEF DESCRIPTION OF THE DRAWINGS

FIG. 14 is a diagram showing the relationship between FIGS. 14A and 14B;

FIG. 14A is a diagram showing an example of a processing flow for web application in a first flow;

FIG. 17 is a diagram showing the relationship between FIGS. 17A and 17B;

FIG. 17A is a diagram showing an example of a processing flow for web application in a second flow.

DESCRIPTION OF THE EMBODIMENTS

Hereinafter, the best mode for implementing the present invention will be described with reference to the drawings. Note that parts having the same function are denoted by the same symbol in each diagram and duplicated description will be omitted.
(First Embodiment)
[System Configuration]

Figure 1:
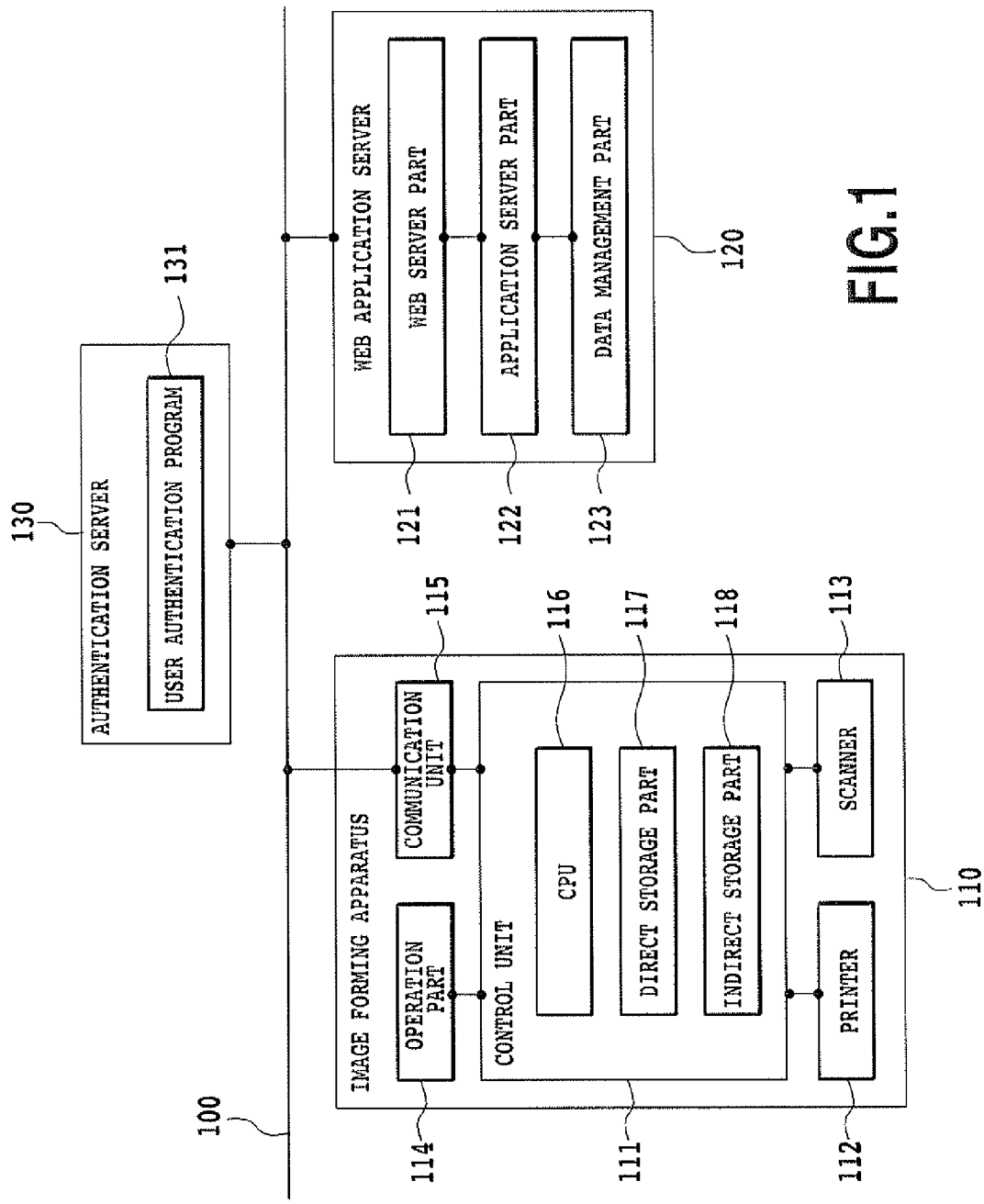
FIG. 1 is an example of a block diagram showing a system configuration.

FIG. 1 is a block diagram showing an entire configuration of a system including an image forming apparatus according to a first embodiment of the present invention.

A web application server 120 is a computer such as a personal computer and a workstation. The web application server 120 includes a CPU, a direct storage unit, indirect storage unit, and an external interface which are not shown in the drawing, as main constituents. The indirect storage unit stores an operating system (OS) and various kinds of application programs which are software programs and these programs are read into the direct storage unit to be executed by the CPU.

The following application programs are stored in the web application server 120 in the present embodiment and configured to be executable by the CPU.

1) A web server part 121 transmitting content such as HTML data in response to a request of an HTTP protocol from a client 2) An application server part 122 which is an application program loaded in a form such as a CGI (Common Gateway Interface) program and Servlet for carrying out predetermined processing according to an HTTP request and a dynamically varying HTTP response 3) A data management part 123 performing preservation of script data called out from the application server part 122, storage of the received data, storage of various access logs and an operation log, and perpetuation of various kinds of data An authentication server 130 is a computer similar to the web application server 120. The authentication sever 130 stores a user authentication program 131 which is an application program for user authentication, and the authentication program 131 is configured to be executable by a CPU. The user authentication program 131 causes the CPU to execute the following processing.

The user authentication program 131 is notified by the image forming apparatus 110 or the web application server 120 of user account information such as a user name, a domain name, and a password. The user authentication program 131 carries out user authentication by comparing the notified user account information and user account information under management. If the user authentication has succeeded, the user authentication program 131 returns Security Token (hereinafter, ST) to the image forming apparatus 110 or the web application server 120. The user account is user credit information necessary for the user authentication, and indicates a user name, a domain name, a password, etc, for example. ST is an authentication token which is returned when the user account is confirmed to be authenticated and the user authentication has succeeded.

The image forming apparatus 110 is a multi function peripheral (MFP) performing image input and output, image transmission and reception, and various kinds of image processing. The image forming apparatus 110 includes a scanner 113 which is an image input device, a printer 112 which is an image output device, a control unit 111, an operation part 114 which is a user interface, and a communication unit 115 for performing external communication. Each of the scanner 113, printer 112, and operation part 114 is connected to the control unit 111 and controlled by an instruction from the control unit 111. The control unit 111 is connected to a LAN via the communication unit 115.

The control unit 111 is configured with a CPU 116, a direct storage part 117 (e.g., RAM), and an indirect storage part 118 (e.g., ROM or HDD). The direct storage part 117 is a storage part for directly exchanging data with the CPU 116, and the indirect storage part 118 is a storage part for exchanging data with the CPU 116 via the direct storage part 117. The indirect storage part 118 stores software such as an operating system (OS) and various kinds of application programs, which are read into the direct storage part to be executed by the CPU 116. By the above processing, the control unit 111 executes various kinds of application programs which are to be described hereinafter and can carry out various kinds of processing. In the present specification, "execution" and "processing" of each application program means that the above control unit 111 "executes" and "processes" the application program, respectively.

The web application server 120, the authentication server 130, and the image forming apparatus 110 are connected to a LAN 100 (Local Area Network) so as to be communicable thereamong.

[Appearance Configuration of the Image Forming Apparatus 110]

Figure 2:
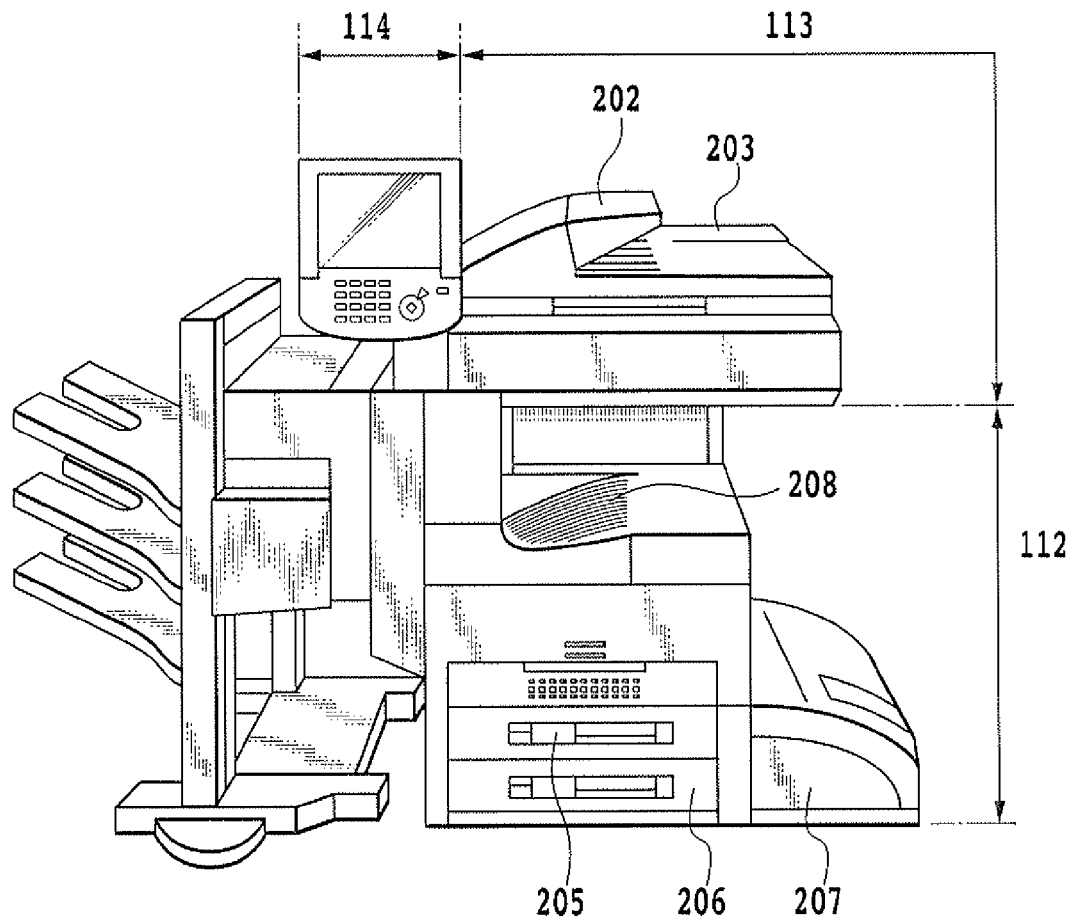
FIG. 2 is an example of an appearance diagram of an image forming apparatus.

An appearance configuration of the image forming apparatus 110 will be described with reference to FIG. 2. FIG. 2 is a diagram showing the appearance configuration of the image forming apparatus 110 shown in FIG. 1.

In the image forming apparatus 110, the scanner 113 illuminates an image on a document paper and generates raster image data by scanning the image with a CCD line sensor (not shown in the drawing). When a user sets the document paper on a tray 202 of a document feeder 203 and provides an instruction of reading start on the operation part 114, the control unit 111 generates a scan job and provides an execution instruction to the scanner 113. Then, the document feeder 203 feeds the document papers one by one and the scanner 113 carries out the reading operation of the document image fed by the document feeder 203. The control unit 111 completes the generated scan job after finishing of the reading and generates a job log as the completion result.

The printer 112 prints the raster image data on a paper, and an electrophotographic method using a photosensitive drum or a photosensitive belt is used for the print method. Note that obviously other methods such as an ink jet method printing an image directly on a paper by ejecting ink from a miniature nozzle array may be used for the print method. For the print operation of the printer 112, the control unit 111 generates a print job and provides an execution instruction to the printer 112. The printer 112 has a plurality of paper feeding stages so that different paper sizes or different paper directions may be selected, and is provided with paper cassettes 205, 206, and 207 corresponding thereto. A paper discharge tray 208 is also provided and a printed paper is discharged into this paper discharge tray 208. The control unit 111 completes the generated print job after finishing of the paper discharge and generates a job log as the completion result.

[Operation Part 114 of the Image Forming Apparatus 110]

Figure 3:
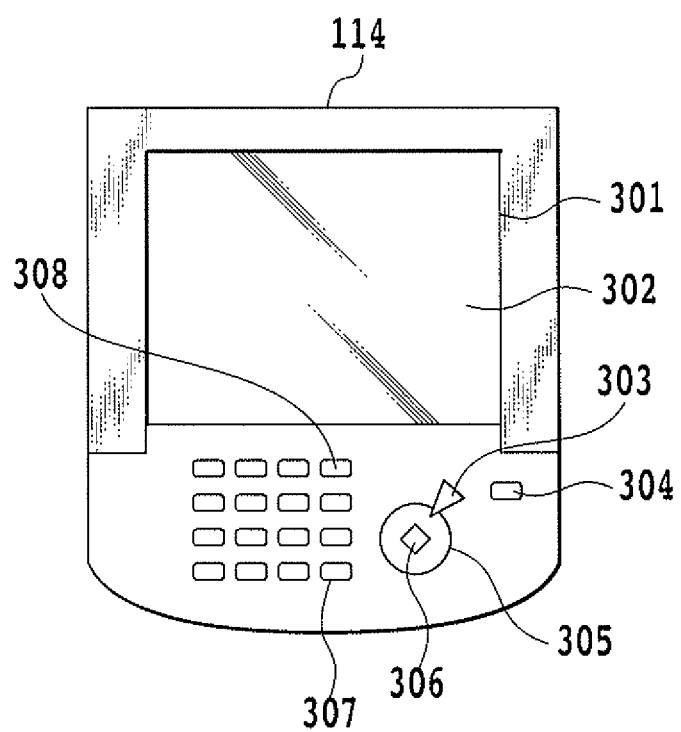
FIG. 3 is an appearance diagram of an operation part of an image forming apparatus.

Next, a configuration of the operation part 114 will be described with reference to FIG. 3. FIG. 3 is a diagram showing an appearance configuration of the operation part 114 of FIG. 1. The operation part 114 includes an LCD display part 501 having a touch panel sheet 302 attached on an LCD. This LCD display part 501 displays a system operation screen and soft keys and, when a displayed key is pressed, also transfers positional information indicating the pressed position to the control unit 111.

In addition, the operation part 114 is provided with various kinds of hard keys of a start key 305, a stop key 303, an ID key 307, and a reset key 304. The start key 305 is a key for providing an instruction of stating the document image reading operation and the start key 305 is provided with an LED display part 306 having two colors of green and red in the center part thereof. The two color LED display part 306 indicates whether the start key 305 can be used or not by the color. The stop key 303 is a key for interrupting operation during a job. The ID key 307 is a key used for inputting a user ID of the user. The reset key 304 is a key used for initializing a setting from the operation part 114.

[Software Configuration of the Control Unit 111]

Figure 4:
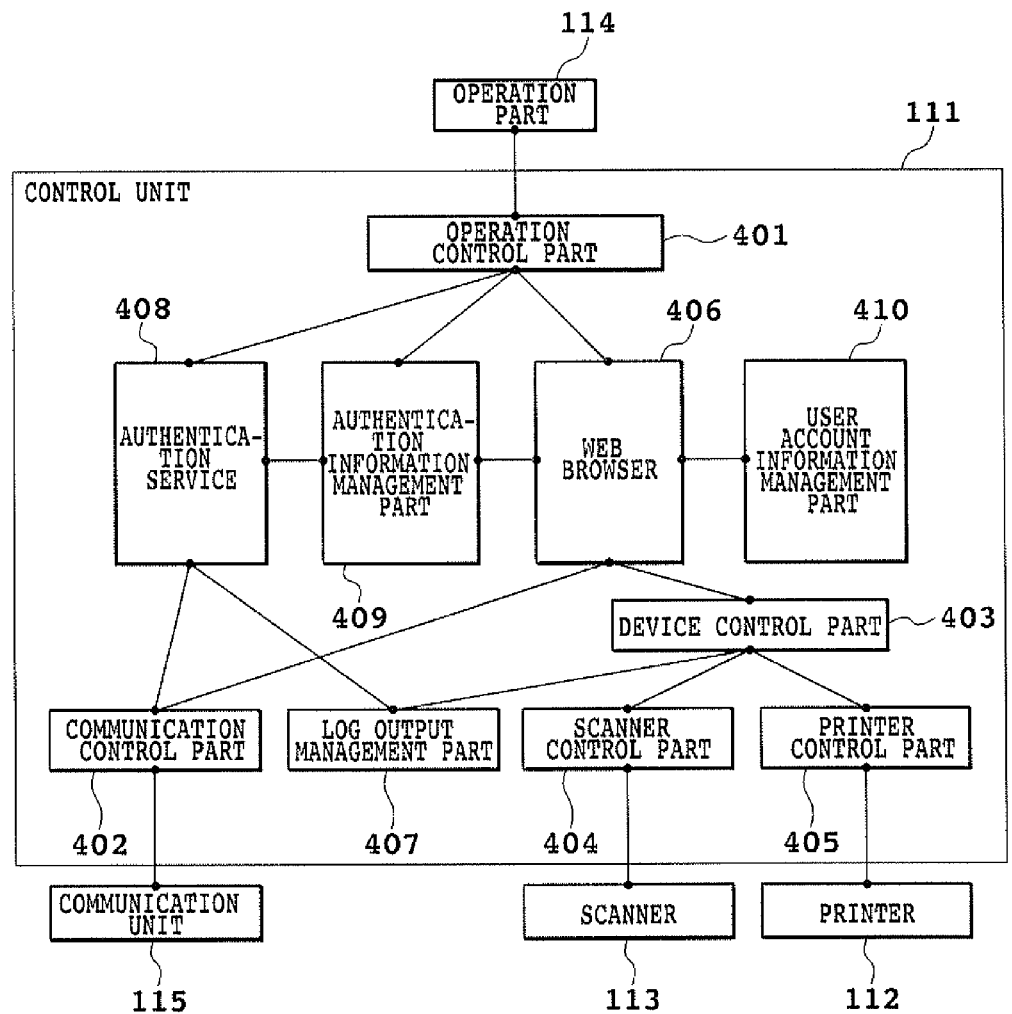
FIG. 4 is an example of a software configuration diagram of a control unit in an image forming apparatus.

Next, a software configuration of the control unit 111 will be described with reference to FIG. 4. FIG. 4 is a block diagram showing the software configuration of the control unit 111 in the image forming apparatus 110 of FIG. 1. The control unit 111 is connected with the scanner 113 which is an image input device and the printer 112 which is an image output device and controls these devices. On the other hand, the control unit 111 executably stores an application program inputting and outputting image information and device information via the communication unit 115.

An operation control part 401 is an application program for inputting and outputting information to and from the operation part 114. The operation control part 401 outputs image data to be displayed on the operation part 114 to the operation part 114 and carries out display control of various kinds of LEDs provided in the operation part 114. Further, the operation control part 401 receives information input by the user via the operation part 114 and performs a role of such as transferring of the information to another application program via the operating system.

A communication control part 402 is an application program connected to the communication unit 115 for inputting and outputting information to and from the communication unit 115.

A device control part 403 is an application program for interpreting instructions output from other application programs to each device (scanner 113, or the like) provided in the image forming apparatus 110 and providing an instruction to a printer control part 405 or a scanner control part 404 to be described below. The other application programs outputting the instructions include a web browser 406, a copy application program and a FAX transmission application program which are not shown in the drawing, etc.

Each of the application programs requests the device control part 403 to generate various kinds of jobs for providing instructions of utilizing various functions of the image forming apparatus 110. At this time, it is possible to set an attribute of the generated job. The attributes to be set include a user name of the job, an attribute value such as a document name accompanying the job, and a setting value specifying the behavior of the device such as a setting for copying or printing, for example.

The device control part 403 monitors a processing situation of the job in each of the devices and reflects the situation to a job status. When the processing in each device has been completed, the device control part 403 completes the generated job and instructs a log output management part 407 to be described below to output a job log. The information to be output into the job log includes the above described attribute value set in each job, date and time, a job status, a kind of a job, a kind of operation, etc.

The scanner control part 404 is an application program for carrying out correction, modification edition, etc. for input image data from the scanner 113 according to an instruction from the device control part 403. The scanner control part 404 monitors the scanner 113 and the situation of the generated scan job and notifies the device control part 403.

The printer control part 405 is an application program for carrying out correction and resolution conversion for the input image data to be printed out according to an instruction from the device control part 403 and outputting the image data to the printer 112. The printer control part 405 monitors the printer 112 and the situation of the print job and notifies the device control part 403.

A web browser 406 is an application program for reading various kinds of website (home page) information on the Internet or an intranet and displaying the information. A detailed configuration of this web browser 406 will be described hereinafter.

The log output management part 407 is an application program for storing information about authentication processing carried out in an authentication service 408 and operation carried out through the operation part 114 into the indirect storage part as a job log. The contents of the stored job log will be described hereinafter.

The authentication service 408 is an application program for controlling the user authentication processing carried out when the user utilizes the function of the image forming apparatus 110. The authentication service 408 receives the user account information input from the operation part 114 via the operation control part 401 and carries out the authentication processing. The authentication service 408 can issue ST when the user authentication has succeeded in the authentication processing result. As another embodiment, the authentication service 408 may transmit the received user account information to the authentication server 130 and receive ST issued by the authentication server 130 after the authentication processing thereof.

An authentication information management part 409 is an application program for storing and managing ST returned from the authentication service 408 after the success of the user authentication and the user account information which can be obtained from the authentication server 130. Detailed description of the authentication information management part 409 will be described hereinafter.

A user account information management part 410 is an application program for the web browser 406 to register or obtain the user account information using the authentication information stored and managed in the authentication information management part 409 and the URI (particularly URL) of the website as keys. Specifically, this account information is transferred to the web application server 120 via the web browser 406. The data structure of the user account information to be registered in the user account information management part 410 will be described hereinafter. Note that the user account information management part 410 is an application program necessary for a second flow to be described hereinafter and is not necessary for a first flow.

[Authentication Information Management Part 409]

The authentication information management part 409 stores and manages the authentication information of the user who has logged in to the image forming apparatus 110. The authentication service 408 transfers information necessary for generation of the user authentication information (e.g., ST or the like) to the authentication information management part 409 after the success of the authentication. The authentication information management part 409 generates authentication information in which the user information is written. When the authentication has succeeded and the user information has been written in the authentication information, the image forming apparatus 110 operates within a range of a user's authority written in the authentication information for the user's operation after that. Further, the authentication information management part 409 manages a life cycle of the authentication information. The life cycle of the authentication information is a cycle from the generation of the authentication information to user's log-out processing. Log-out conditions include instruction of the log-out processing by the user via the operation part 114, no operation via the operation part 114 for a set time-out period, change of the various kinds of device setting information, transfer to a low-power mode, and device restart.

Figure 7:
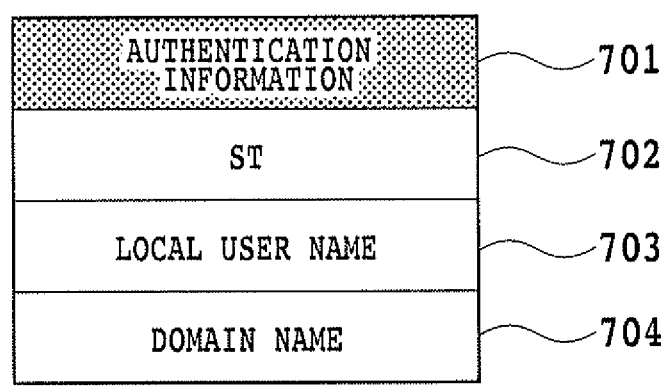
FIG. 7 is a diagram showing an example of a data structure for authentication information.

Next, an example of a data structure for the authentication information will be described by use of FIG. 7. The authentication information 701 includes an ST attribute 702, a local user name attribute 703, and a domain name attribute 704. The ST attribute 702 stores ST obtained from the authentication service 408. The local user name attribute 703 stores the user name obtained from the authentication service 408. The domain name attribute 704 stores a domain name to which the user belongs, obtained from the authentication service 408.

[User Account Information Management Part 410]

Figure 8:
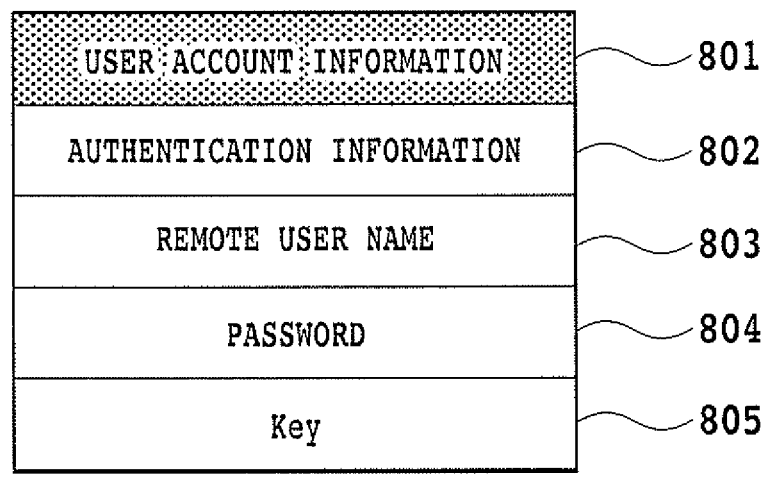
FIG. 8 is a diagram showing an example of a data structure for user account information.

An example of a data structure for the user account information registered by the user account information management part 410 will be described by use of FIG. 8. The user account information 801 includes an authentication information attribute 802, a remote user name attribute 803, a password attribute 804, and a key attribute 805. The authentication information attribute 802 stores the authentication information shown in FIG. 7. The remote user name attribute 803 stores a log-in user name for the web application server 120. The password attribute 804 (Password) stores a log-in password for the web application server 120. From a viewpoint of security, it is preferable that the password attribute be encrypted for storing. The key attribute 805 is configured so as to be able to register plural pairs of key and character string. The "key" here is . . . , for example. The "character string" is . . . , for example. The key attribute 805 stores the address of the web application server 120 which utilizes this user account information, the URI of a website, etc.

Note that processing control by the user account information management part 410 will be described in the second flow to be described hereinafter.

[Job Log Output in the Log Output Management Part 407]

Figure 9:
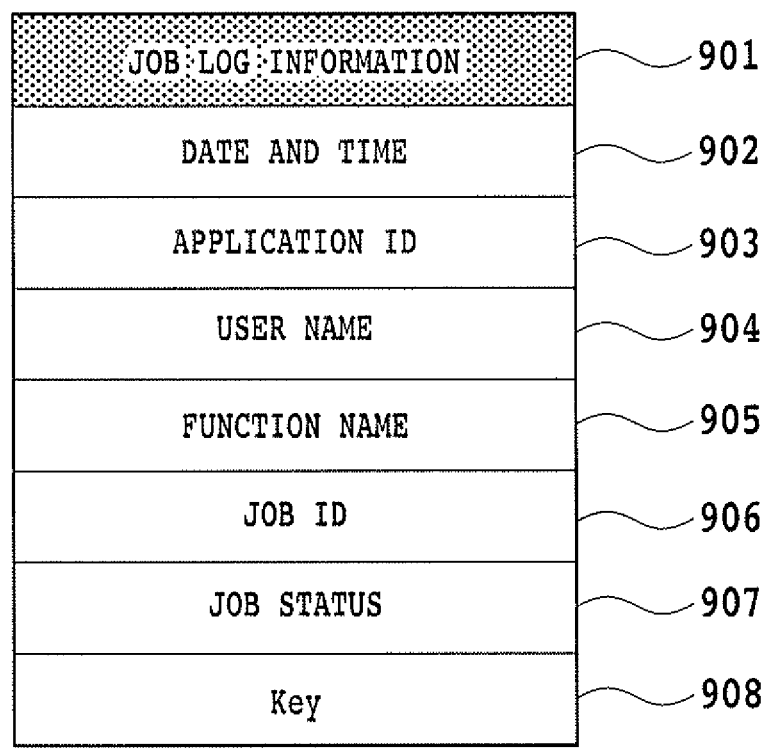
FIG. 9 is a diagram showing an example of a data structure for log information.

An example of a data structure for the job log information output in the log output management part 407 will be described by use of FIG. 9. The job log information 901 includes a date and time attribute 902, an application ID attribute 903, a user name attribute 904, a function name attribute 905, a job ID attribute 906, a job status attribute 907, and a key attribute 908. The date and time attribute 902 stores date and time when the job log information is output. The application ID attribute 903 stores GUID set for each application program. The user name attribute 904 stores a user name input from each application program. The function name attribute 905, the job ID attribute 906, and the job status attribute 907 are a name of a function executed by each application program, a generated job ID, and a status of the job, respectively, which are input from each application program and stored therein. The key attribute 908 is configured so as to be able to register plural pairs of key and character string. The key attribute 908 includes an attribute name and an attribute value set for each job, and information which each application sets and inputs optionally.

[Configuration of the Web Browser 406]

The web browser 406 is an application program for setting up connection with another network node and carrying out communication therewith via the communication control unit 402. In this communication, an HTTP request is issued to a resource described by a URL and a response thereof is obtained. Also in this process, communication data is encoded or decoded according to various kinds of encoding formats.

The web browser 406 receives an event of operation which the user carried out using a touch panel sheet or each of the keys on the operation part 114 and executes processing corresponding to each of the events. In addition, the web browser 406 is provided with a script interpreter (not shown in the drawing). The script interpreter is a program interpreting and executing a script such as Java (registered trade mark) Script (ECMA Script). The script is embedded in a document or described in a separated file linked to the document. The script enables dynamic behavior of a document provided by the web application server 120 to be programmed.

[Request and Response Flow in the HTTP Protocol]

Figure 5:
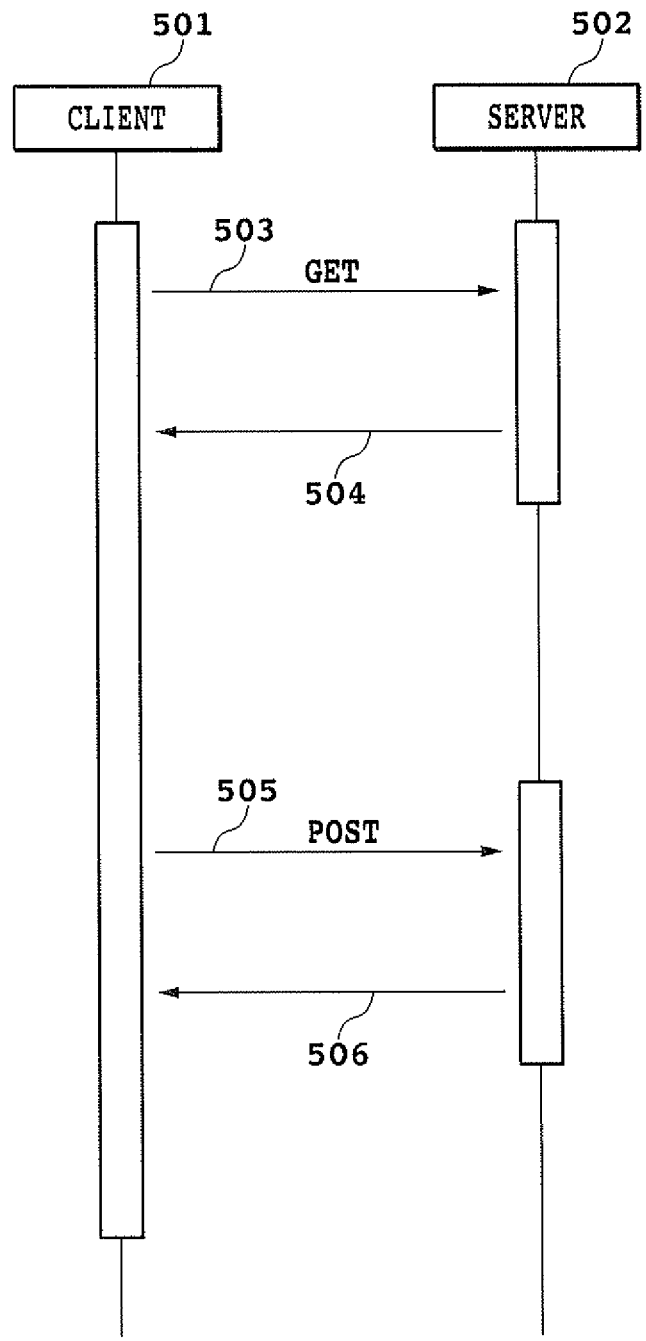
FIG. 5 is an example of a sequence diagram showing a processing flow of a request and a response by an HTTP protocol.

FIG. 5 is a sequence diagram of a request and response process flow in the HTTP protocol. A client 501 is software transmitting an HTTP request and receiving an HTTP response. The client 501 corresponds to the web browser 406 built in the image forming apparatus 110 of the present embodiment and a typical web browser operating on a computer which is not shown in the drawing. A server 502 is software receiving the HTTP request to carry out corresponding processing and further returning the HTTP response, and corresponds to the web application server 120 of the present embodiment.

The client 501 can transmit the HTTP request in either a GET method or a POST method. Here, when the client 501 transmits an HTTP request for a desired resource to the server 502 in the GET method, the resource is specified typically in the URI (particularly URL) format. The server 502 obtains or generates data corresponding to the resource specified by the HTTP request and returns this data in the HTTP response.

Next, a case where the HTTP request is transmitted by the POST method will be described. For the case that a form is included in an HTML document and the POST method is specified for the transmission method thereof, the following processing is carried out. That is, information input by a user into a form displayed by the web browser 406 of the client 501 is encoded, and the encoded information, that is, input contents of the form is transmitted to the server 502 as an attachment to the HTTP request. In the server 502, the specified resource receives the data transmitted from the client 501, caries out processing, generates an HTTP response, and returns the HTTP response to the client 501.

Next, authentication by the HTTP protocol will be described. The authentication in the HTTP protocol has largely divided two methods. One is an authentication method utilizing header information defined in the HTTP protocol, and includes the NTLM authentication and the Kerberos authentication, for example. The other one is a method called a form authentication, which is provided with a form inputting a user name and a password into a web site and the web browser POSTs the information to the web application server.

Currently, more than half of the websites employ the latter form authentication method because some web browsers do not accommodate the former authentication method and the former authentication method needs a certificate. Accordingly, the present specification will describe a sequence of the HTTP protocol in the form authentication.

The client 501 provides GET to the URI of a log-in site for the form authenticating. The log-in site on the obtained HTML document generally includes a form for inputting an ID or a name of a log-in user, a form for inputting a password, and a button action for executing log-in. When the user input information into these forms and executes the log-in, the client 501 POSTs the information to the server 502.

The POSTed sever 502 carries out authentication according to the received information. After having succeeded in the authentication, the server 502 generates a Session ID which is session unique information, and responds to the client 501 by transmitting the Session ID together with the HTML document after the authentication.

In the succeeding processing between the client 501 and the server 502, the generated Session ID is transmitted and received, and thereby the authenticated state is maintained. This Session ID is retained by both sides as information effective within a set time limit.

[Screen Configuration of the Browser in the Image Forming Apparatus 110]

Next, a screen configuration of the web browser 406 for a screen displayed by the operation part 114 will be described with reference to FIG. 6. A browser screen 600 displays a tab 601, a URL input field 608, an OK button 609, a progress bar 607, a content display area 602, a back button 603, a forward button 604, a reload button 606, an interrupt button 605, and a status area 610.

The tab 601 switches the screen from a screen of another function (copy, box, transmission, expansion, or the like) for utilizing the function of the web browser 406 in the image forming apparatus 110. The URL input field 608 is a field into which a user inputs the URL of a desired resource, and when the field is pressed by the user, a virtual full key board (not shown in the drawing) is displayed for character input. The user can input a desired character string with a soft key emulating a key top disposed on the virtual full key board.

The OK button 609 is a soft key determining the input URL character string. When the URL has been determined, the web browser 406 issues an HTTP request for obtaining the resource. The progress bar 607 shows a progress status of the content obtaining processing by the HTTP request and response. The content display area is an area for displaying the obtained resource. The back button 603 is a soft key for re-displaying content which was displayed before currently displayed content by tracking back a history of the content display. The forward button 604 is a soft key for returning to a display of content which has been displayed after the currently displayed content when the display is tracking back the history of the content display. The reload button 606 is a soft key for obtaining and displaying currently displayed content again. The interrupt button 605 is a soft key for interrupting content obtaining processing under execution. The status area 610 is an area for displaying a message from each of the various application programs of the image forming apparatus 110. This status area 610 can display a message to call attention to a user from each of the scanner 113, the printer 112, and other functions even when the browser screen 600 is being displayed. Further, the status area 610 can display a message from the function of the web browser 406 in the same manner. The function of the web browser 406 displays a URL character string of a link destination, a title character string of the content, a message specified by the script, etc.

(First Flow)

Next, for the embodiment of the present invention, a first processing flow will be described with reference to a flowchart.

[Log-In Flow for the Image Forming Apparatus 110]

Figure 10:
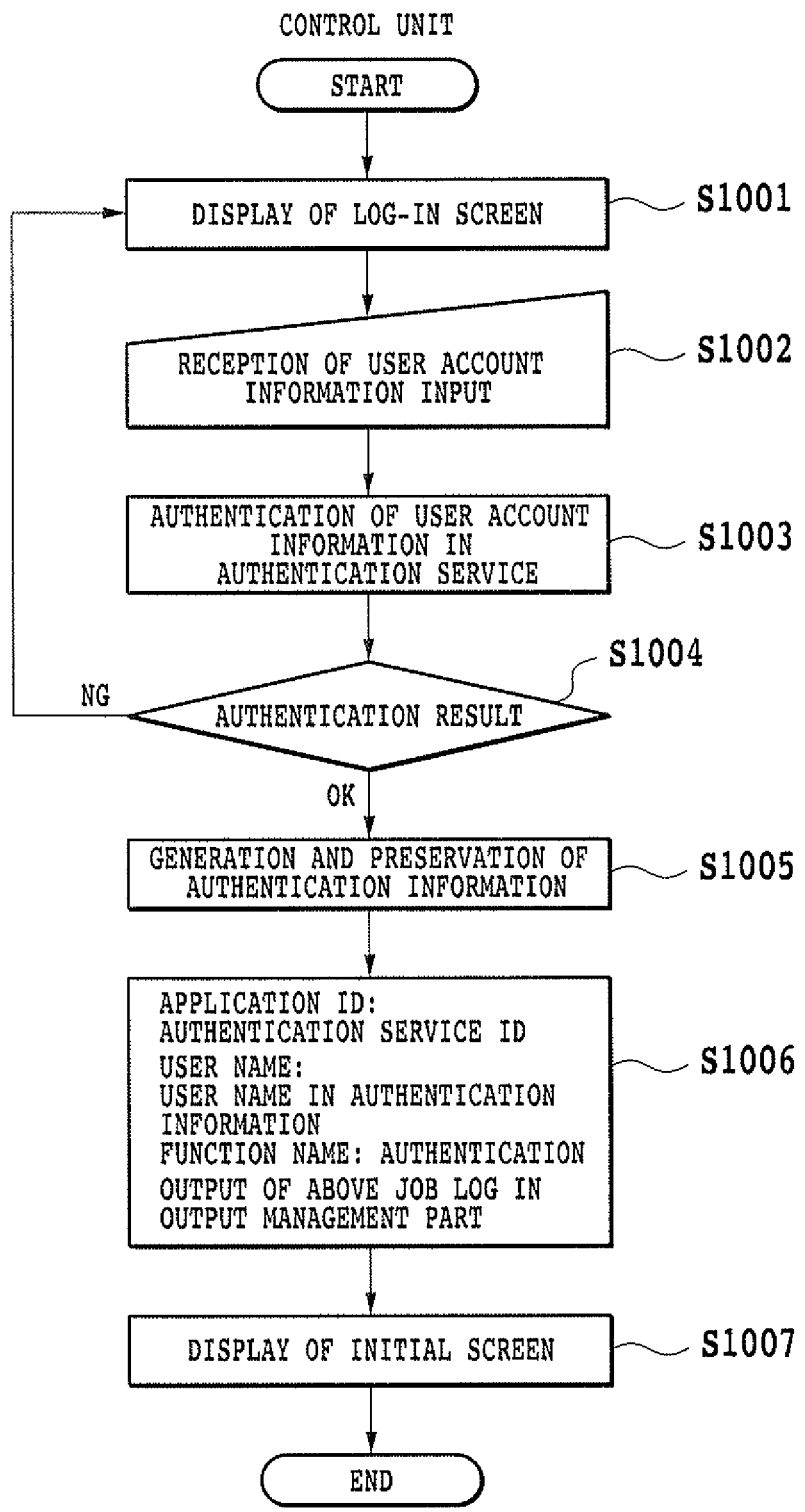
FIG. 10 is a diagram showing an example of a log-in flow for an image forming apparatus in a first flow.
Figure 11:
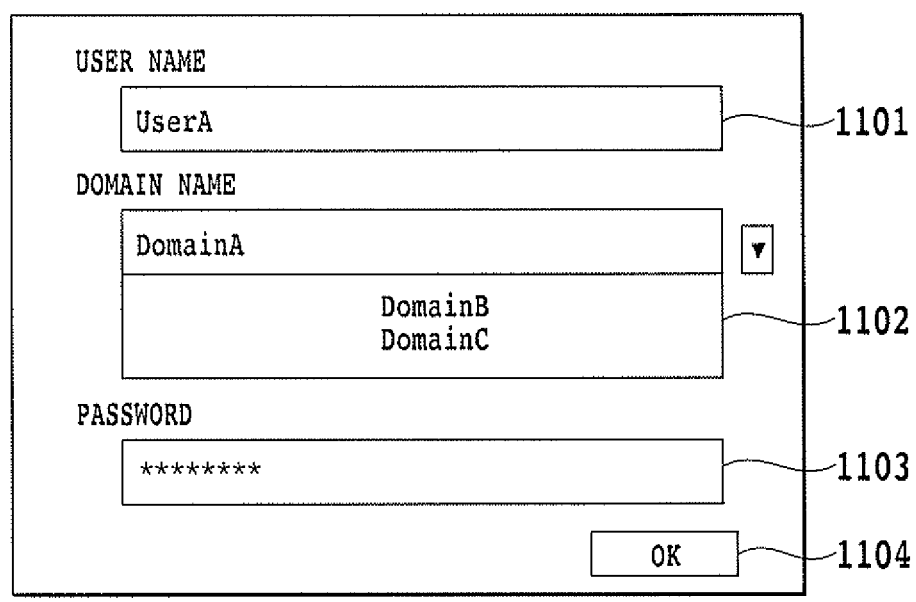
FIG. 11 is a diagram showing an example of a log-in screen in an image forming apparatus.

FIG. 10 is a flowchart showing log-in processing for the image forming apparatus 110 in the control unit 111. FIG. 11 shows an example of a screen displayed on the operation part 114 when the user authentication is carried out by a user account of a user name, a domain name, and a password. The log-in processing for the image forming apparatus 110 in the control unit 111 will be described by use of FIG. 10 and FIG. 11.

In step S1001, the operation control part 401 displays a log-in screen as shown in FIG. 11 on the operation part 114 according to information obtained from the authentication service 408 in the control unit 111.

Next, the log-in screen example of FIG. 11 will be described. A user name input text box 1101 is a text box area for inputting a user name. Hereinafter, the user name input into the user name input text box 1101 is called a local user name for discrimination from a user name to be input in the log-in to the web application server 120 as will be described hereinafter. When the user has selected the user name input text box 1101, the operation control part 401 carries out processing for displaying the software key board on the operation part 114. Thereby, the user can carry out the character input easily.

A domain name input textbook 1102 is a text box area for inputting a domain name. The domain name input text box 1102 is a multiple-choice type.

A password input text box 1103 is a text box area for inputting a password.

When a user pushes down an OK button 1104, the user account information including the input user name, domain name, and password information is transferred to the authentication service 408 via the operation control part 401. That is, the pushing down of the OK button 1104 by the user provides an execution request of the authentication function included in the image forming apparatus 110.

In step S1002, after the user account information of the user has been input via the operation part 114, the user account information is notified to the authentication service 408 via the operation control part 401 of the control unit 111.

In step S1003, the authentication service 408 determines validity of the received user account (i.e., carries out the authentication processing). If the user account is not valid in the validity determination result (step S1004: NG), the operation control part 401 displays the log-in screen again on the operation part 114 in step S1001.

If the user account is valid (step S1004: OK), in step S1005, the above authentication information is generated according to the user account information and stored into the authentication information management part 409.

In step S1006, the authentication service 408 transfers the following information to the log output management part 407 as an application ID, a user name, and a function name, and the log output management part 407 generates a job log using the information.

Application ID: application ID of the authentication service 408
User name: local user name in the authentication information
Function name: authentication Next, in step S1007, the control unit 111 presents an initial screen for selection of the application program functions provided in the control unit 111 on the operation part 114. The initial screen corresponds to the web browser screen shown in FIG. 6, for example.

From this step to user log-out, each of the application programs in the control unit 111 can utilize the function of the image forming apparatus 110 after having obtained the authentication information stored in the authentication information management part 409 and generated the job log.

[Log-In Flow for the Web Application Server 120]

Figure 12:
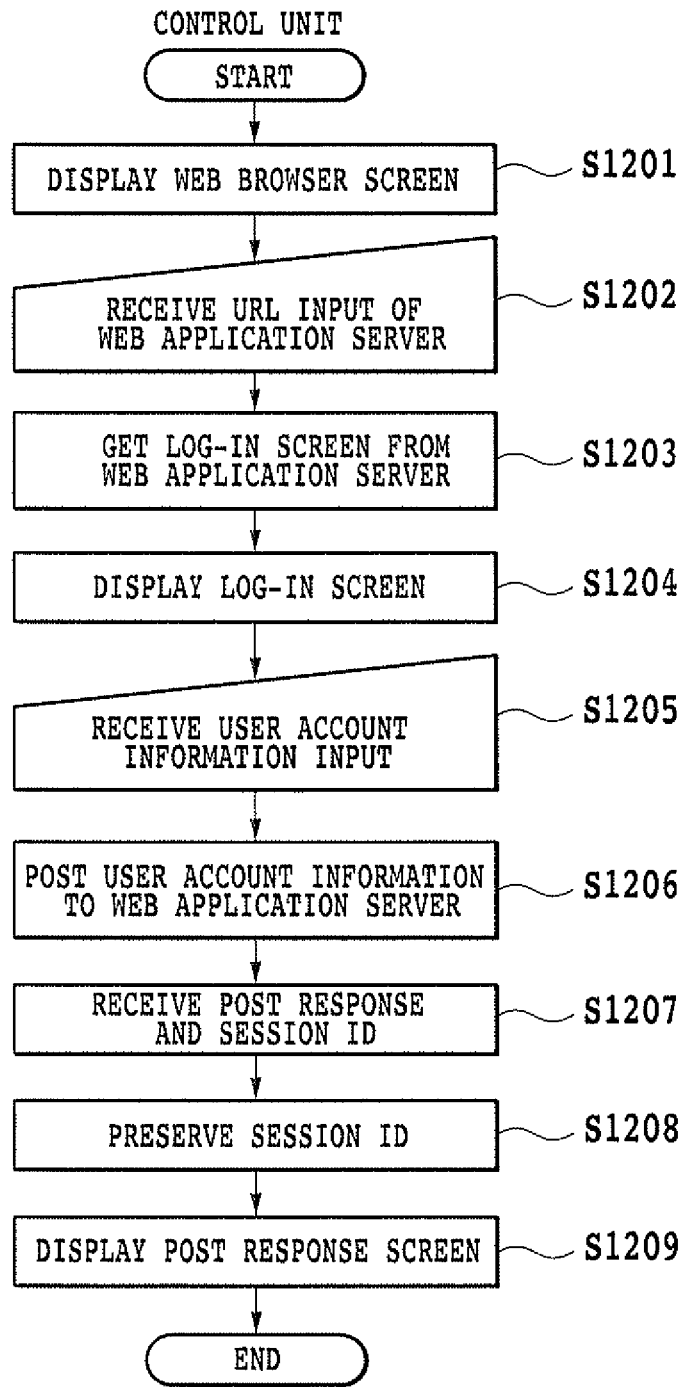
FIG. 12 is a diagram showing an example of a log-in flow for a web application server in a first flow.

FIG. 12 is a flowchart of a log-in processing for the web application server 120 in the web browser 406 of the control unit 111.

Figure 6:
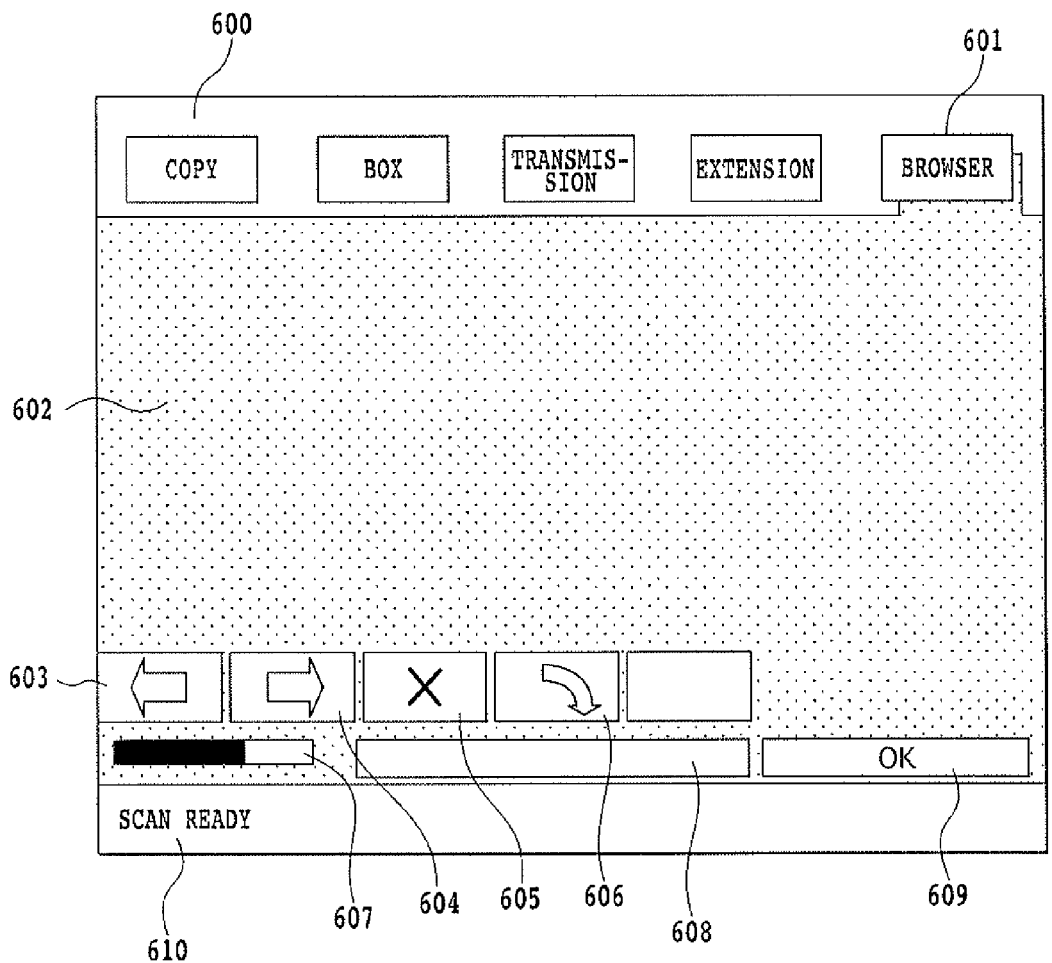
FIG. 6 is a diagram showing an example of a screen configuration of a web browser in an image forming apparatus.

In step S1201, the control unit 111 displays the web browser screen 600 shown in FIG. 6 on the operation part 114 via the operation control part 401. This screen may be displayed when the user has selected the function of the web browser 406 on the operation part 114, or may be displayed as an initial screen after the log-in to the image forming apparatus 110.

Next, the web browser 406 waits for URL input for a log-in site and the push down of the OK button from the user via the operation part 114, in step S1202. Then, when the URL is input and the OK button is pushed down, the web browser 406 provides a GET request to the web application server 120 corresponding to the URL input via the communication control part 402 and the communication unit 115, in step S1203.

Note that, in a case where this log-in site URL is registered in the web browser 406 as an initial display URL, the above processing of step S1202 and step S1203 can be skipped.

In step S1204, the web browser 406 displays a log-in screen provided by the web application server 120 as a response on the operation part 114 via the operation control part 401. The log-in screen displayed here (not shown in the drawing) is provided with forms for inputting a user name (hereinafter, called a remote user name for discrimination from the local user name) and a password and a log-in (or OK) button for determining the input.

In step S1205, the web browser 406 receives input of user account information from the user and push down of the log-in button via the operation part 114 and the operation control part 401. The user account information input here includes a remote user name and a password for the log-in to the web application server 120.

In step S1206, the web browser 906 POSTs the received user account information to the web application server 120 via the communication control part 402 and the communication unit 115.

The web application server 120 transmits the account information to the authentication server 130 for verifying whether the received user account is valid or not, and generates a Session ID, which is session unique information, corresponding to the user account if the user account is valid. Then, the web application server 120 generates a device function screen corresponding to the user account and provides the screen to the communication unit 115 as a response. If the user account is not valid, the web application server 120 generates a screen showing that the authentication has failed and provides the screen to the communication unit 115 as a response.

Here, if the user account information is valid, the web application server 120 outputs and stores a log which includes the user account information and the generated Session ID and shows the log-in of the user. The user account information and the Session ID included in the log-in log become identification information of this log. The user account information and the Session ID included in a log to be described below also become log identification information in the same manner. Note that the identification information is not necessarily included in the log, and the log and the identification information have only to be associated with each other.

In step S1207, the web browser 406 receives the response screen and the Session ID information from the web application server 120 via the communication control part 402 and the communication unit 115.

Next, in step S1208, the web browser 406 associates the received Session ID information with the user account information and stores these information into the indirect storage part 118 or the like. Note that the Session ID information is stored so as to be obtainable using the user account information as a key until the user logs out from the website or a preservation period set for the Session ID elapses. That is, by the processing of step S1206 and step S1208, the Session ID information is stored in both of the image forming apparatus 110 and the web application server 120 as common information.

Next, in step S1209, the web browser 406 displays the received response screen on the operation part 114 via the operation control part 401.

Figure 13:
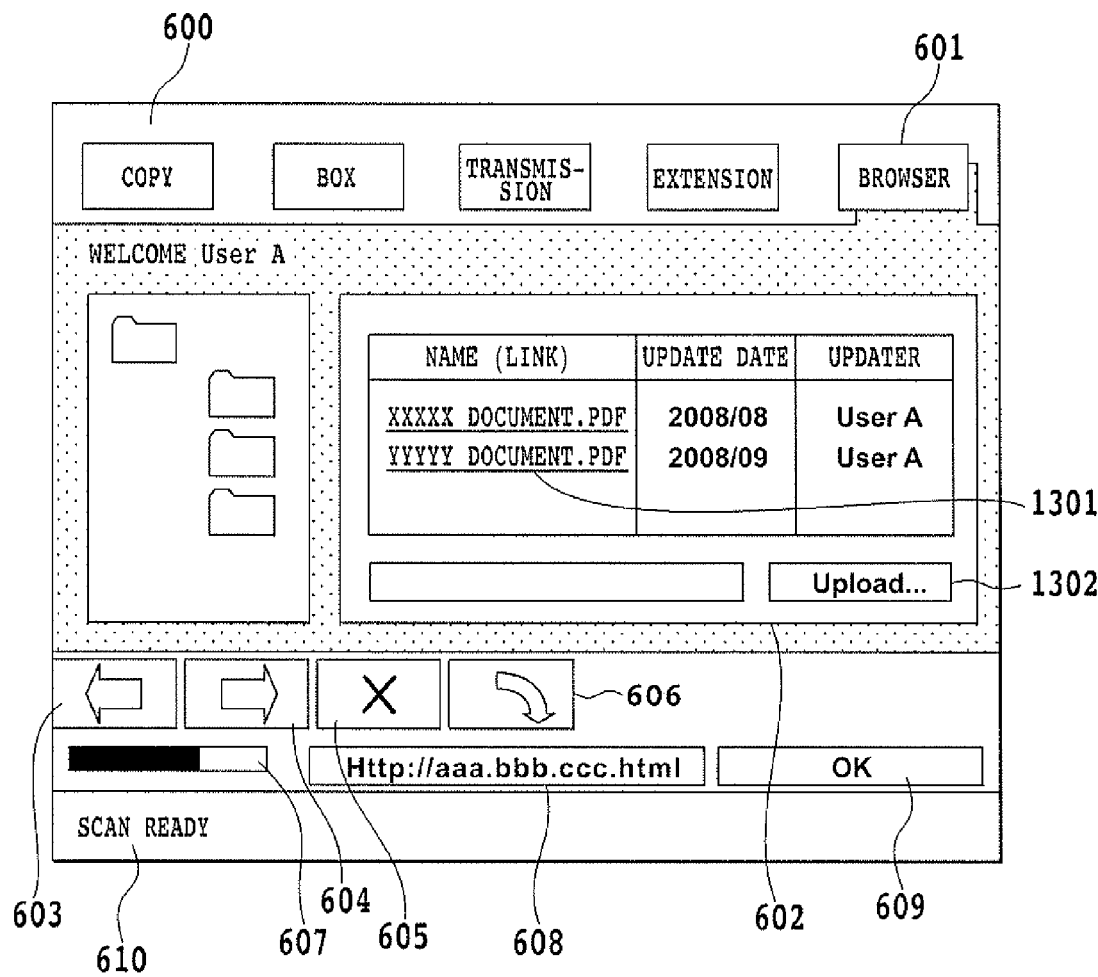
FIG. 13 is a diagram showing an example of a function screen for web application.

FIG. 13 shows an example of the web application screen presented after the log-in to the website. This web application screen shows an example of a document management application.

A link 1301 is link information for the URI of the presented document. When the user has selected this link information, the web browser 406 is notified of the selection of the link information of the document, via the operation part 114 and the operation control part 401. Details of processing after the notification will be described hereinafter.

An upload button 1302 is a button for instructing upload of electronic data of a document generated in the image forming apparatus 110 to the web application server 120. When the user pushes down this upload button 1302, the web browser 406 is notified of the push down of the upload button via the operation part 114 and the operation control part 401. Details of operation after the notification will be described hereinafter.

In this manner, the log-in to the image forming apparatus 110 is carried out and further the log-in to the web application server 120 is carried out. In a case where the authentication service is different between the respective log-in flows, there is a possibility that the respective input user account information may be different from each other. Further, even if the authentication services are unified, there may be an operation in which some user inputs different user accounts into respective apparatuses. As a result, there is a possibility that the local user name included in the authentication information managed by the image forming apparatus 110 and the remote user name which has logged in to the web application server 120 are different from each other.

[Utilization of the Function in the Image Forming Apparatus 110]

Figure 14B:
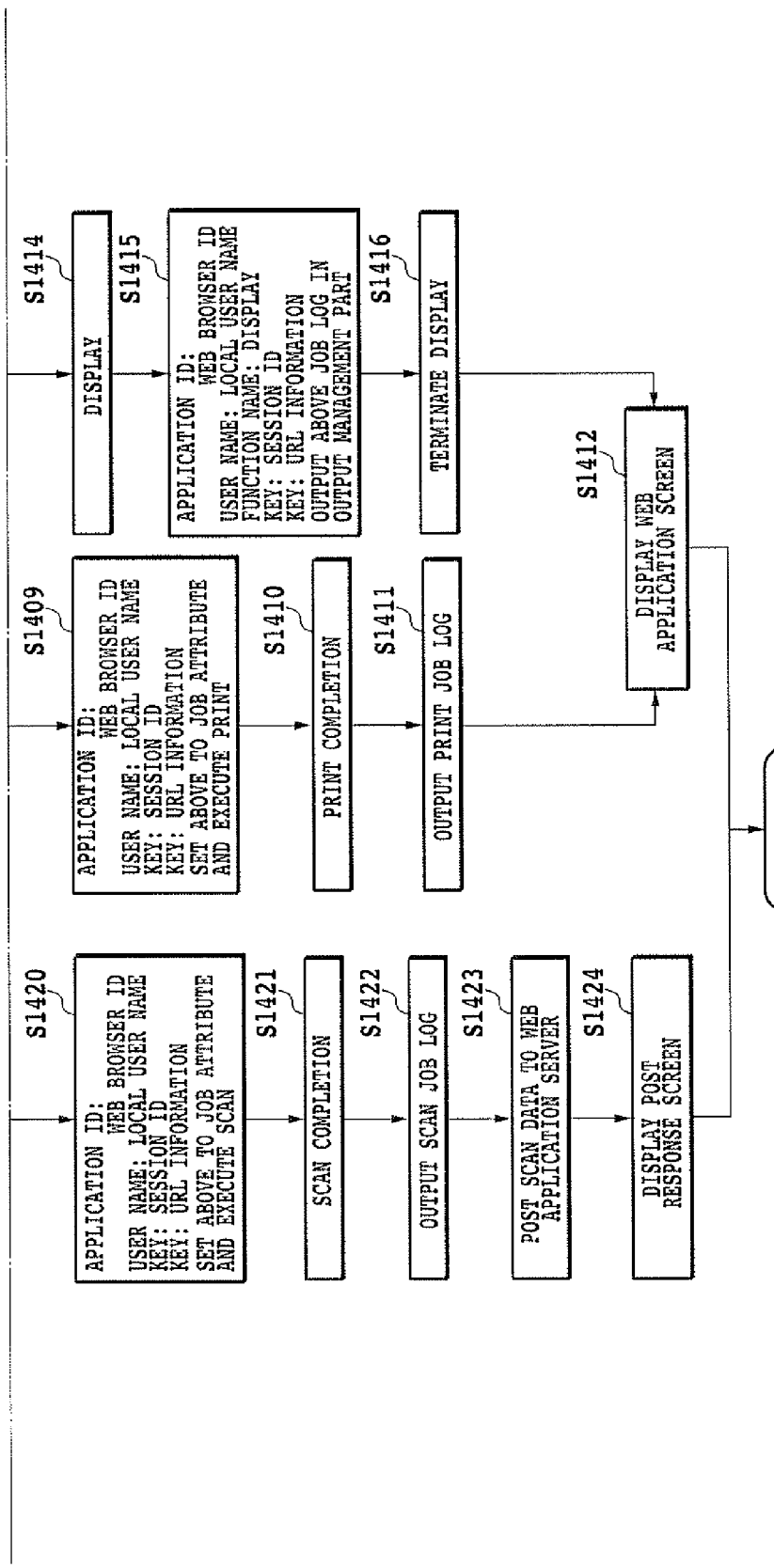
FIG. 14B is a diagram showing an example of a processing flow for web application in a first flow.

FIGS. 14A and 14B illustrate a flowchart showing processing when the function of the image forming apparatus 110 is utilized from the web browser 406 of the control unit 111. The present specification describes the web application described by use of FIG. 13 as an example.

In step S1401, the web browser 406 displays a web application screen. The following processing will be described on the assumption that the web browser 406 displays an example of the web application screen shown in FIG. 13 in this step.

In step S1402, the web browser 406 receives a function selected by a user in the web application screen via the operation part 114 and the operation control part 401. That is, the image forming apparatus 110 receives an execution request of the function of the image forming apparatus 110 from the user. The process is branched in step S1403 depending on the selected function.

First, a case where "document link" has been selected will be described.

In step S1404, the web browser 406 transmits a request in the get method to the URL indicated by the selected link via the communication control part 402 and the communication unit 115 and obtains and stores document data together with the Session ID.

Here, the web application server 120 outputs and preserves a log indicating that the document has been obtained in the GET method. The log includes the user account information of the user having logged in to the web application server 120, the Session ID of a session accessed by the user, and the URL of the obtained document data.

Figure 15:
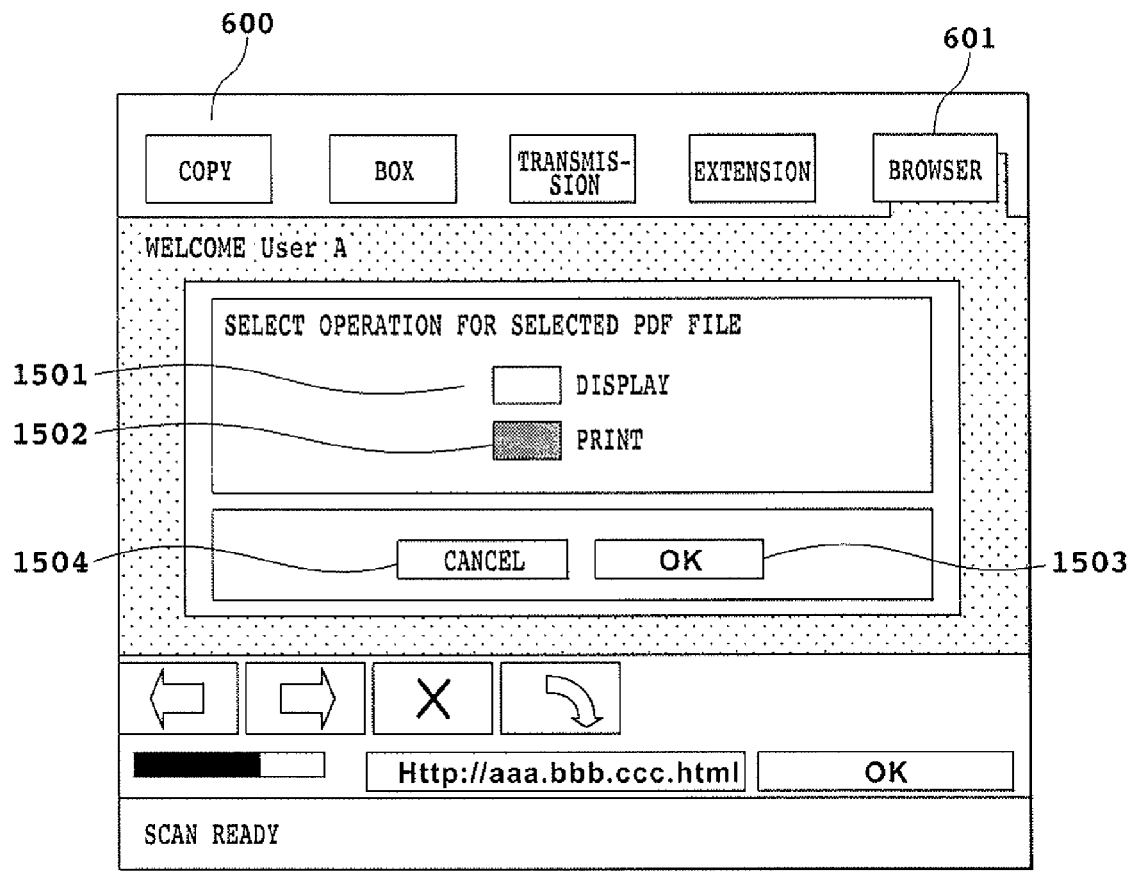
FIG. 15 is a diagram showing an example of a function screen displayed by a web browser.

Next, in step S1405, the web browser 406 displays a screen for selecting the function of the web browser 406 as shown in FIG. 15 on the operation part 114 via the operation control part 401.

Here, an example of the screen for selecting the function of the web browser 406 shown in FIG. 15 will be described. A web browser function selection screen 1501 is a screen showing a function capable of processing a format of the obtained document. This example shows that display and print processing is possible for the format of the obtained document. A function selection button 1502 shows a selected state of the function. When an OK button 1503 is pushed down, the selected function is executed. When a cancel button 1504 is pushed down, the obtained document data is discarded and the function selection screen 1501 is closed.

Next, in step S1406, the web browser 406 receives the selected function. In step S1407, the process is branched depending on the selected function.

Next, the succeeding process will be described for a case where a print function has been selected in step S1406.

In step S1408, the web browser 406 obtains currently preserved Session ID and the linked URI of the document. At the same time, the web browser 406 obtains the authentication information of the user currently having logged into the image forming apparatus 110 from the authentication information management part 409.

In step S1409, the web browser 406 sets the following information to a print job attribute and instructs the device control part 403 to generate and execute a print job.

Application ID: application ID of the web browser 406
User name: local user name in the authentication information
Key: Session ID
Key: URI of the document The device control part 403 instructs the printer 112 to generate the print job and to carry out printing via the printer control part 405. The printer control part 405 monitors the situation of the printing in the printer 112 and notifies the device control part 403 when having detected completion of the printing in step S1410.

In step S1411, the device control part 403 notifies the log output management part 407 of the attribute information of the completed print job. The log output management part 407 carries out job log outputting of the print job in response to the received notification.

Then, after the execution of these functions has been completed, the device control part 403 notifies the web browser 406 of the print completion.

In step S1412, the web browser 406 closes the function selection screen 1501 shown on the operation part 114 and displays the web application screen again via the operation control part 401.

Next, a case where a display function has been selected in step S1406 will be described.

In step S1413, the web browser 406 obtains the currently preserved Session ID and the linked URL of the document. At the same time, the web browser 406 obtains the authentication information of the user currently having logged in to the image forming apparatus 110 from the authentication information management part 409.

In step S1414, the web browser 406 displays a preview of the obtained document on the operation part 114 or a display part (not shown in the drawing).

In step S1415, the web browser 406 transfers the following information to the log output management part 407 and generates a job log.

Application ID: application ID of the web browser 406
User name: local user name in the authentication information
Function name: display
Key: Session ID information
Key: URI of the document Next, in step S1416, when the user has closed the preview display screen via the operation part 114, the operation control part 401 detects it and the web browser 406 displays the web application screen again in step S1412.

Next, a case where the function selected in step S1402 is "upload" will be described.

In step S1417, the web browser 406 displays a scan setting screen (not shown in the drawing) on the operation part 114 via the operation control part 401. The scan setting screen can set scan operation behavior (e.g., setting of both-side reading, color/monochrome reading, etc.). Then, in step S1418, the web browser 406 receives a scan execution request of the user from the operation part 114 via the operation control part 401.

In step S1419, the web browser 406 obtains the currently preserved Session ID and the URL of upload destination of the document. At the same time, the web browser 406 obtains the authentication information of the user currently having logged in to the image forming apparatus 110 from the authentication information management part 409.

In step S1420, the web browser 406 sets the attribute set on the above scan setting screen and the following information to a scan job attribute and instructs the device control part 403 to generate and execute a scan job.

Application ID: application ID of the web browser 406
User name: local user name in the authentication information
Key: Session ID information
Key: URI of the upload destination The device control part 403 provides an instruction of generating the scan job and reading via the scanner control part 404. The scanner control part 404 monitors the situation of the reading by the scanner 113 and notifies the device control part 403 when detecting the completion of reading in step S1421.

In step S1422, the device control part 403 notifies the log output management part 407 of the attribute information of the completed scan job and carries out job log outputting of the scan job.

Then, when the execution of these functions has been completed, the device control part 403 notifies the web browser 406 of the completion of the scanning.

In step S1423, the web browser 406 POSTs electronic data of the document generated by the scanning to the URI of specified upload destination via the communication control part 402 and receives a POST response.

Here, the web application server 120 outputs and preserves a log indicating that the document has been uploaded. The log includes user account information of the user having logged in to the web application server 120, the Session ID, and the URL of the uploaded document data.

Next, in step S1424, the web browser 406 displays a response screen received in the POST response on the operation part 114 via the operation control part 401.

By the above processing, it becomes possible to output information identical to the Session ID generated in the web application server 120 to the job log after the utilization of the function in the web browser 406.

Accordingly, when document data obtained from the web application server 120 is printed, for example, it is possible to prove that this processing is a series of processing requested by the same user by associating the logs with each other using the following method. That is, first, the log output from the web application server 120, indicating that the document data has been obtained by a GET request, is searched for. Next, by use of the Session ID included therein as a key, the job log output in the image forming apparatus 110 is searched for and associated.

Accordingly, by the above described processing, it is possible to record a audit trail including information common to both devices of the web application server and the image forming apparatus.

(Second Flow)
In the first flow, when the authenticated user accounts are different between the web application server 120 and the image forming apparatus 110, a difference occurs between the user names included in the logs output in the respective apparatuses. Accordingly, log association can be carried out only by the Session ID. A second flow is a flow in which the log association is easier than in the first flow and search capability and readability of the log (that is, audit trail) are improved.

Hereinafter, the second flow will be described with reference to a flowchart. Note that description of the same processing as that of the first flow will be omitted.

Figure 16:
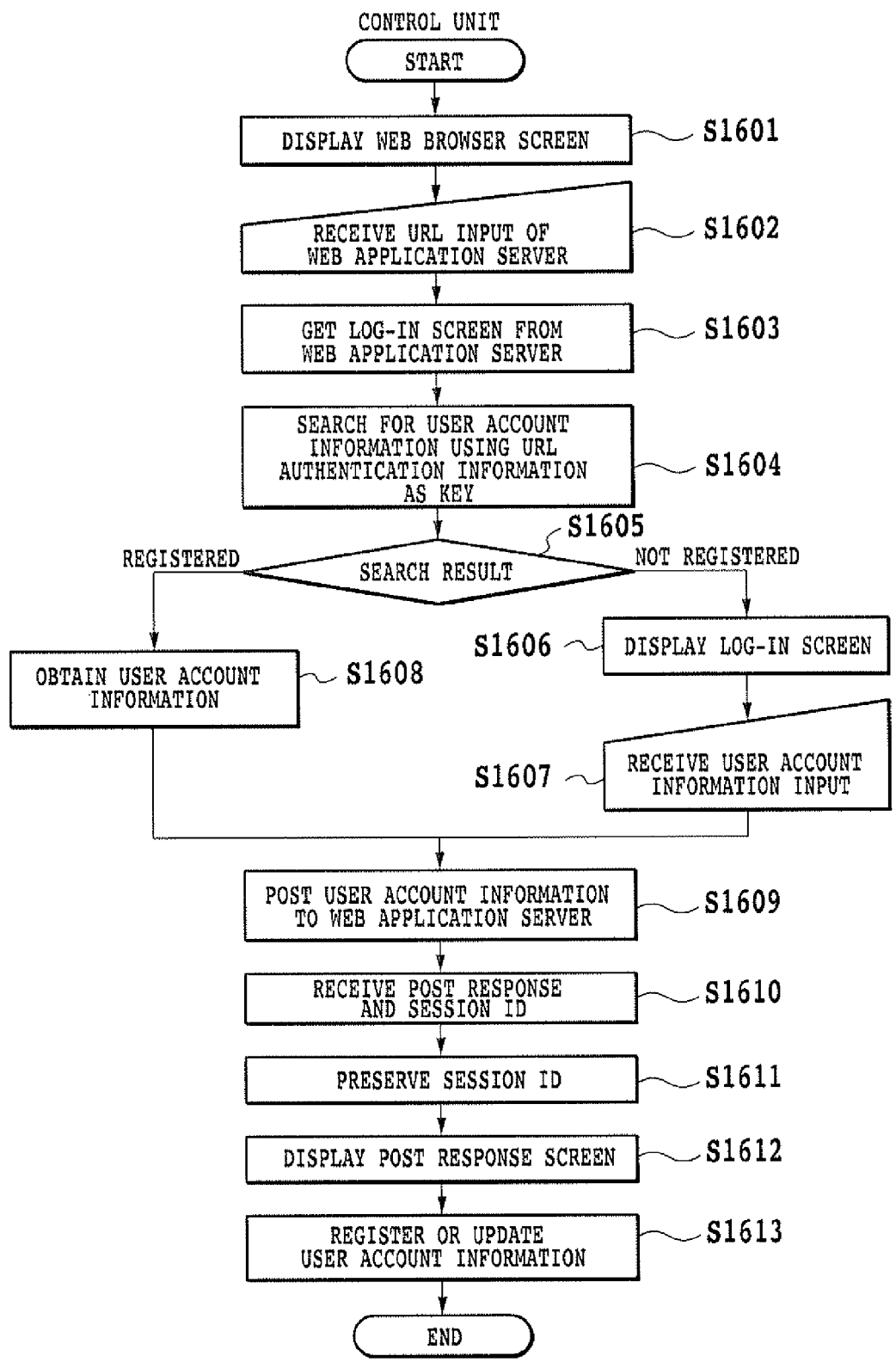
FIG. 16 is a diagram showing an example of a log-in flow for a web application server in a second flow.

FIG. 16 is a flowchart showing log-in processing for the web application server 120 in the web browser 406 of the control unit 111, in the second flow.

In step S1601, the control unit 111 displays the web browser screen 600 shown in FIG. 6 on the operation part 114 via the operation control part 401. The web browser screen 600 is displayed when a user has selected the web browser 406 via the operation part 114, or may be displayed as an initial screen after log-in to the image forming apparatus 110.

Next, the web browser 406 waits for URL input and OK button push down by the user in step S1602. Then, when the user has inputted the URL of a log-in site and pushed down the OK button, in step S1603, the web browser 406 provides a GET request to the target web application server 120 via the communication control part 402 and the communication unit 115.

In a case where this log-in site URL is registered as an initial display URL in the web browser 406, above step S1602 and step S1603 can be skipped.

Next, instep S1604, the web browser 406 obtains the authentication information of the user having logged in to the image forming apparatus 110 from the authentication information management part 409. Then, the web browser 406 searches the user account information management part 410 for user account information using the URL of the website to be displayed and the obtained authentication information as keys. In step S1605, the process is branched depending on the search result.

If the user account information is not registered and the information has not been obtained as the search result in step S1605, the web browser 406 displays a login screen provided by the web application server 120 as a response on the operation part 114 in step S1606. The log-in screen (not shown in the drawing) displayed here is provided with a form for inputting a remote user name and a password and a log-in (or OK) button for determining the input.

In step S1607, the web browser 406 receives and obtains input of the user account information from the user and push down of the log-in button via the operation part 114 and the operation control part 401. The user account information obtained here includes the remote user name and the password for log-in to the web application server 120.

In a case where the user account information is registered as the search result in step S1605, the web browser 406 obtains the user account information from the user account information management part 410 in step S1608. The user account information obtained here includes the remote user name and the password registered in the user account information management part 410 when the user logged in to the web application server 120 in the past.

Next, in step S1609, the web browser 406 POSTS the obtained user account to the web application server 120 via the communication control part 402 and the communication unit 115.

The web application server 120 inquires the authentication server 130 whether the received user account is valid or not, and, if valid, generates a Session ID which is session unique information corresponding to the user account. Then, the web application server 120 generates a device function screen corresponding to the user account and provides the Session ID and the device function screen to the communication unit 115 as a response. If the user account is not valid, the web application server 120 generates a screen indicating that the authentication has failed and provides the screen to the communication unit 115 as a response.

When the user account information is valid here, the web application server 120 outputs a log which includes the user account information and the generated Session ID and indicates that the user has logged in.

In step S1610, the web browser 406 receives the response screen and the Session ID information from the web application server 120 via the communication control part 402 and the communication unit 115.

Next, in step S1611, the web browser 406 associates the received Session ID information with the user account and stores these information for management. Note that the Session ID information is stored so as to be reusable by use of the user account as a key until the user logs out from the website or until a preservation period set for the Session ID elapses.

In step S1612, the web browser 406 displays the received response screen on the operation part 114.

Next, in step S1613, the web browser 406 registers the user account information POSTed in step S1609 to the user account information management part 410. When the user account information is already registered, the user account information is updated. At this time, the web browser 406 registers the URI of the log-in screen and the authentication information obtained in step S1604 as key information for searching for the user account information.

This user account information which is stored and managed in the user account information management part 410 may be configured to be registered or deleted from the screen displayed on the operation part 119 via the operation control part 401. Further, the user account information may be configured to be registered or deleted from an external computer connected by the network via the communication control part 402 and the communication unit 115.

[Utilization of the Function in the Image Forming Apparatus 110]

Figure 17B:
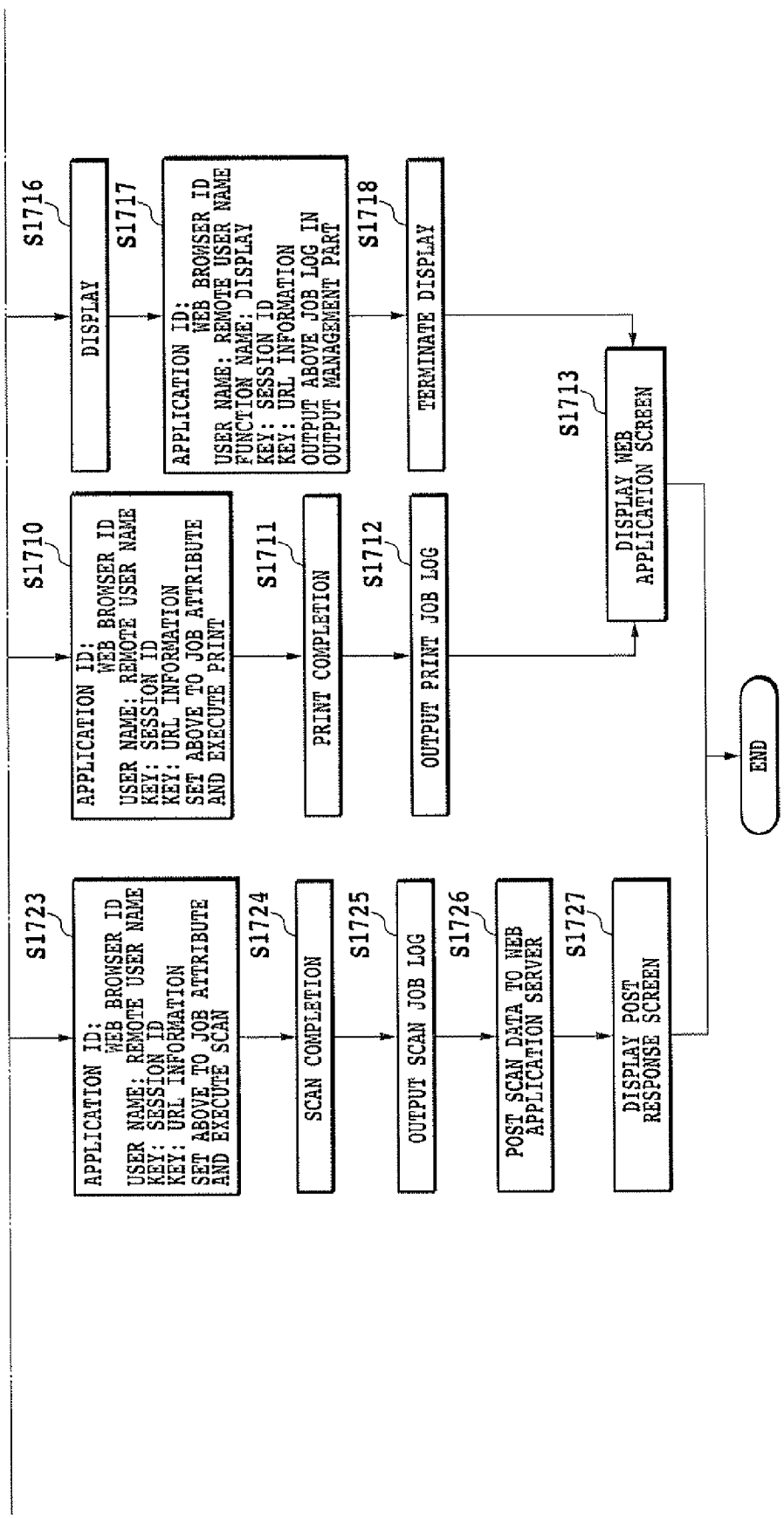
FIG. 17B is a diagram showing an example of a processing flow for web application in a second flow.

FIGS. 17A and 17B illustrate a flowchart showing processing in the second flow for a case where the function of the image forming apparatus 110 is utilized from the web browser of the control unit 111. The present specification will describe the web application described by use of FIG. 13, as an example.

In step S1701, the web browser 406 displays a web application screen. Description will be given on the assumption that the web browser 406 displays the web application screen shown in FIG. 13 in this step.

In step S1702, the web browser 406 receives a function selected by a user in the web application screen from the user via the operation part 114 and the operation control part 401. The process is branched depending on the selected function in step S1703.

First, a case where "document link" has been selected will be described.

In step S1704, the web browser 406 provides a GET request to a URL indicated by the selected link via the communication control part 402 and the communication unit 115, and obtains and preserves document data together with a Session ID.

Here, the web application server 120 outputs and preserves a log indicating the GET request of the document. The log includes user account information of a user having logged in to the web application server 120, a Session ID of a session accessed by the user, and the URL of the obtained document data.

Next, in step S1705, the web browser 406 displays a screen for selecting the function of the web browser 406 as shown in FIG. 15 on the operation part 119 via the operation control part 401.

Next, in step S1706, the web browser 406 receives a selected function. The process is branched depending on the selected function in step S1707.

Next, the succeeding processing will be described when a print function has been selected in step S1706.

In step S1708, the web browser 406 obtains the currently preserved Session ID and the linked URI of the document. At the same time, the web browser 406 obtains the authentication information of the user currently logged in to the image forming apparatus 110 from the authentication information management part 409.

Next, in step S1709, the web browser 406 searches the user account information management part 410 for user account information using the authentication information obtained from the authentication information management part 409 as a key, and obtains the user account information and the URI. Then, the web browser 406 retains the user account information when the URI on the web application screen and the obtained URI are completely identical.

When completely identical URI does not exist, the web browser 406 obtains a URI having the latest update date and time, compares the obtained URI with URI host information on the web application screen, and retains the user account information if they are identical.

When the user account information is not retained as a result, the same processing as that in the first flow is carried out from here.

In step S1710, the web browser 406 sets the following information to the print job attribute and instructs the device control part 403 to generate and execute a print job.

Application ID: application ID of the web browser 406
User name: remote user name obtained from the user account information management part 410
Key: Session ID information
Key: URI of the document The device control part 403 provides an instruction of print job generation and printing via the printer control part 405. The printer control part 405 monitors the situation of the printing in the printer 112 and notifies the device control part 403 when having detected completion of the printing in step S1711.

In step S1712, the device control part 403 notifies the log output management part 407 of the attribute information of the completed print job. The log output management part 407 carries out job log outputting of the print job in response to the received notification.

Then, when the execution of these functions has been completed, the device control part 403 notifies the web browser 406 of the completion of the printing.

In step S1713, the web browser 406 closes the function selection screen 1501 displayed on the operation part 114 via the operation control part 401 and displays the web application screen again.

Next, a case where a display function has been selected in step S1706 will be described.

In step S1714, the web browser 406 obtains the currently preserved Session ID and the linked URI of a document. At the same time, the web browser 406 obtains authentication information of the user who has currently logged in to the image forming apparatus 110 from the authentication information management part 409.

Next, in step S1715, the web browser 406 searches the user account information management part 410 for user account information using the authentication information obtained from the authentication information management part 409 as a key, and obtains the user account information and the URI. Then, the web browser 406 retains the user account information when the URI on the web application screen and the obtained URI are completely identical.

When completely identical URI does not exist, the web browser 406 obtains a URI having the latest update date and time, compares the obtained URI with URI host information on the web application screen, and retains the user account information if they are identical.

When the user account information is not retained as a result, the same processing as that in the first flow is carried out from here.

In step S1716, the web browser 406 displays a preview of the obtained document on the operation part 114 or the display part (not shown in the drawing).

In step S1717, the web browser 406 transfers the following information to the log output management part 407 and generates a job log.
 Application ID: application ID of the web browser 406
 User name: remote user name obtained from the user account information management part 410
 Function name: display
 Key: Session ID information
 Key: URI of the document Next, when the user has closed a screen displaying the preview via the operation part 114 in step S1718, the operation control part 401 detects it and the web browser 406 displays the web application screen again in step S1713.

Next, a case where "upload" is a function selected in step S1702 will be described.

In step S1719, the web browser 406 displays the scan setting screen (not shown in the drawing) on the operation part 114 via the operation control part 401.

The scan setting screen can set scan operation behavior (e.g., setting of both-side reading, color/monochrome reading, etc.). Then, in step S1720, the web browser 406 receives a scan execution request of the user from the operation part 114 via the operation control part 401.

In step S1721, the web browser 406 obtains the currently preserved Session ID and the URL of upload destination of the document. At the same time, the web browser 406 obtains the authentication information of the user currently having logged in to the image forming apparatus 110 from the authentication information management part 409.

Next, in step S1722, the web browser 406 searches the user account information management part 410 for user account information using the authentication information obtained from the authentication information management part 409 as a key, and obtains the user account information and the URI. Then, the web browser 406 retains the user account information when the URI on the web application screen and the obtained URI are completely identical.

When completely identical URI does not exist, the web browser 406 obtains a URI having the latest update date and time, compares the obtained URI with URI host information on the web application screen, and retains the user account information if they are identical.

When the user account information is not retained as a result, the same processing as that in the first flow is carried out from here.

In step S1723, the web browser 406 sets the attribute set on the above scan setting screen and the following information to the scan job attribute and instructs the device control part 403 to generate and execute a scan job.
 Application ID: application ID of the web browser
 User name: remote user name obtained from the user account information management part 410
 Key: Session ID information
 Key: URI of the upload destination The device control part 403 provides an instruction of generating the scan job and reading via the scanner control part 404. The scanner control part 404 monitors the situation of the reading by the scanner 113 and notifies the device control part 403 when detecting the completion of the reading in step S1724.

In step S1725, the device control part 403 notifies the log output management part 407 of the attribute information of the completed scan job and carries out job log outputting of the scan job.

Then, when the execution of these functions has been completed, the device control part 403 notifies the web browser 406 of the completion of the scanning.

In step S1726, the web browser 406 POSTs electronic data of the document generated by the scanning to the URI of specified upload destination via the communication control part 402 and receives a POST response.

Here, the web application server 120 outputs and preserves a log indicating that the document has been uploaded. The log includes user account information of the user having logged in to the web application server 120, the Session ID, and the URL of the uploaded document data.

Next, in step S1727, the web browser 406 displays a response screen received in the POST response on the operation part 114 via the operation control part 401.

By the above processing, the image forming apparatus 110 can output the same information as the user name and the Session ID, which are managed by the web application server 120, in the job log after the utilization of the function in the web browser 406.

Accordingly, it is possible to obtain an operation log of a certain user as a whole by searching the job logs retained in the web application server and the image forming apparatus, respectively, using the remote user name of the web application server. As a result, it is possible to realize high search capability and readability for an audit trail.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2008-302846, filed Nov. 27, 2008, which is hereby incorporated by reference herein in its entirety.

What is claimed is:

1. A system comprising a server and an image forming apparatus having a web browser, wherein the image forming apparatus performs first authentication processing in a case where an execution request of an authentication function is made from a local user who intends to log in to the image forming apparatus;

the image forming apparatus displays a screen of the web browser in a case where the first authentication processing has succeeded;

the web browser requests the server to perform second authentication processing in a case where an execution request of an authentication function is made from a remote user who intends to log in to the server;

the server performs the second authentication processing of the remote user upon receipt of the request from the web browser and generates and transfers, in a case where the second authentication processing has succeeded, a Session ID which is session unique information;

the web browser receives, upon generation of the Session ID, the generated Session ID from the server and displays a screen including link information for a document;

accessing, on the web browser, the server using the link information in a case where the remote user has selected the link information;

the server transfers a document corresponding to the link information and stores user account information of a remote user, the Session ID, and the link information as a log;

the web browser receives the document from the server;

the web browser obtains a local user name of a user currently having logged in to the image forming apparatus from the image forming apparatus, and transfers the document, the link information, the Session ID and the local user name to the image forming apparatus in a case where a printing instruction for the document is given to the web browser; and the image forming apparatus prints the document, and stores a log that contains the local user name, the Session ID and the link information associated with each other.

2. A control method for a system comprising a server and an image forming apparatus having a web browser, the control method comprising the steps of:

performing first authentication processing, in the image forming apparatus, in a case where an execution request of an authentication function is made from a local user who intends to log in to the image forming apparatus;

displaying a screen of the web browser, in the image forming apparatus, in a case where the first authentication processing has succeeded;

requesting the server to perform second authentication processing, from the web browser, in a case where an execution request of an authentication function is made from a remote user who intends to log in to the server;

performing, on the server, the second authentication processing of the remote user upon receipt of the request from the web browser and generating and transferring in a case where the second authentication processing has succeeded, a Session ID which is session unique information;

receiving, on the web browser, the generated Session ID from the server and displaying a screen including link information for a document;

accessing on the web browser, the server using the link information in a case where the remote user has selected the link information;

transferring, on the server, a document corresponding to the link information and storing user account information of the remote user, the Session ID, and the link information as a log;

receiving, on the web browser, the document from the server;

obtaining, on the web browser, a local user name of a user currently having logged in to the image forming apparatus from the image forming apparatus, and transferring the document, the link information, the Session ID and the local user name to the image forming apparatus in a case where a printing instruction for the document is given to the web browser; and the image forming apparatus printing the document and storing a log that contains the local user name, the Session ID and the link information associated with each other.

* * * * *